(12) United States Patent
Han et al.

(10) Patent No.: US 10,345,858 B2
(45) Date of Patent: Jul. 9, 2019

(54) SUPPORTING FRAME FOR FLEXIBLE DISPLAY AND FLEXIBLE DISPLAY APPARATUS COMPRISING THE SAME

(71) Applicant: LG Display Co., Ltd., Seoul (KR)

(72) Inventors: MiJin Han, Ansan-si (KR); TaeWoo Kim, Paju-si (KR); JunHyung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 386 days.

(21) Appl. No.: 15/218,800

(22) Filed: Jul. 25, 2016

(65) Prior Publication Data

US 2017/0060188 A1 Mar. 2, 2017

(30) Foreign Application Priority Data

Aug. 31, 2015 (KR) ........................ 10-2015-0123273

(51) Int. Cl.
*G06F 1/16* (2006.01)

(52) U.S. Cl.
CPC .......... *G06F 1/1652* (2013.01); *G06F 1/1641* (2013.01); *G06F 1/1681* (2013.01)

(58) Field of Classification Search
CPC .... G06F 1/1652; G06F 1/1616; G06F 1/1681; H05K 5/0017; H05K 2201/10128; H05K 5/03; H05K 5/0226
See application file for complete search history.

(56) References Cited

U.S. PATENT DOCUMENTS

| | | | | |
|---|---|---|---|---|
| 9,173,287 B1 * | 10/2015 | Kim | ....................... | H05K 1/028 |
| 9,927,841 B2 * | 3/2018 | Gheorghiu | ............ | G06F 1/1652 |
| 2007/0097014 A1 | 5/2007 | Solomon et al. | | |
| 2010/0164836 A1 | 7/2010 | Liberatore | | |
| 2010/0277443 A1 | 11/2010 | Yamazaki et al. | | |
| 2013/0037228 A1 | 2/2013 | Verschoor et al. | | |
| 2014/0003006 A1 | 1/2014 | Ahn | | |
| 2014/0196254 A1 * | 7/2014 | Song | ........................ | E05D 3/14 |
| | | | | 16/302 |
| 2015/0077917 A1 | 3/2015 | Song | | |
| 2015/0131222 A1 * | 5/2015 | Kauhaniemi | ......... | G06F 1/1652 |
| | | | | 361/679.27 |
| 2015/0233162 A1 * | 8/2015 | Lee | ........................ | H04M 1/02 |
| | | | | 16/223 |

(Continued)

FOREIGN PATENT DOCUMENTS

| | | |
|---|---|---|
| CN | 1960612 B | 5/2007 |
| CN | 102262845 A | 11/2011 |

(Continued)

OTHER PUBLICATIONS

China National Intellectual Property Administration, Second Notification of Office Action, CN Patent Application No. 201610797071.8, dated Apr. 17, 2019, 21 pages.

*Primary Examiner* — Dimary S Lopez Cruz
*Assistant Examiner* — Ingrid D Wright
(74) *Attorney, Agent, or Firm* — Fenwick & West LLP

(57) ABSTRACT

A supporting frame for a flexible display panel includes a bending member and a plurality of supporting members. The bending member supports a bendable area of the flexible display panel and is configured to be bent. The plurality of supporting members support non-bendable display areas of the flexible display panel, and each connect to a plurality of connecting surfaces of the bending member.

16 Claims, 12 Drawing Sheets

(56) References Cited

U.S. PATENT DOCUMENTS

| | | | |
|---|---|---|---|
| 2016/0187935 A1* | 6/2016 | Tazbaz | G06F 1/1681 |
| | | | 361/679.03 |
| 2016/0299532 A1* | 10/2016 | Gheorghiu | G06F 1/1652 |
| 2017/0285688 A1 | 10/2017 | Sun | |
| 2017/0303414 A1 | 10/2017 | Chu | |

FOREIGN PATENT DOCUMENTS

| | | |
|---|---|---|
| CN | 103106845 | 5/2013 |
| CN | 103514812 A | 1/2014 |
| CN | 104464529 A | 3/2015 |
| CN | 204331666 U | 5/2015 |
| CN | 104714699 A | 6/2015 |
| CN | 104851365 A | 8/2015 |
| KR | 2014-0133187 A | 11/2014 |
| TW | 201110087 | 3/2011 |

* cited by examiner

SUPPORTING FRAME FOR FLEXIBLE DISPLAY AND FLEXIBLE DISPLAY APPARATUS COMPRISING THE SAME

CROSS REFERENCE TO RELATED APPLICATIONS

This application claims the benefit of the Korean Patent Application No. 10-2015-0123273 filed on Aug. 31, 2015, which is hereby incorporated by reference in its entirety.

BACKGROUND

Field of the Disclosure

Embodiments of the present disclosure relate to a supporting frame for flexible display and a flexible display apparatus comprising the same.

Discussion of the Related Art

Generally, display devices using flat display panels such as liquid crystal display device, plasma display device, organic light emitting display device, electrophoretic display device and electro-wetting display device are applied to notebook computers, portable electronic devices, televisions or monitors.

With the increasing demand for a large-sized screen in the portable electronic devices, an apparatus with a large-sized display area using a flat display panel has been developed and commercialized. A foldable display apparatus or rollable display apparatus using a flexible display panel capable of being bent or folded, which allows ease of portability and large-sized display area, has attracted great attention as a next generation technology for further increasing display areas. The flexible display apparatus may be applied in various fields of televisions, monitors, and dashboards as well as mobile devices of mobile communication terminals, electronic notebooks, electronic books, PMPs (portable multimedia players), navigation, UMPCs (ultra mobile PCs), mobile phones, smart phones, and tablet PCs (personal computers).

An example of the flexible display apparatus is disclosed in US Publication No. 2013/0010405 (hereinafter, referred to as 'related art document'). In case of the flexible display apparatus disclosed in the related art document, a large screen is provided by unfolding a flexible display with respect to a hinge of a hinge structure.

However, the flexible display apparatus disclosed in the related art document may have a problem relating touch sensations on a display area and touch sensations on a bending area of the flexible display due to a gap space between housings by the hinge of the hinge structure. Also, in case of the flexible display apparatus disclosed in the related art document, it is difficult to maintain the bending area in a plane state due to the gap space when the flexible display is unfolded.

SUMMARY

Accordingly, embodiments of the present disclosure are directed to a supporting frame for flexible display and a flexible display apparatus comprising the same that substantially obviates one or more problems due to limitations and disadvantages of the related art.

An aspect of embodiments of the present disclosure provides a supporting frame for a flexible display which reduces differences between user touch sensations on a display area and touch sensations on a bending area of a flexible display panel, and a flexible display apparatus comprising the same. In one embodiment, the supporting frame for the flexible display comprises a bending member and a plurality of supporting members. The bending member supports a bendable area of the flexible display panel, and is configured to be bent. The plurality of supporting members support non-bendable display areas of the flexible display panel. Each supporting member connects to a plurality of connecting surfaces of the bending member.

Another aspect of embodiments of the present disclosure is directed to provide a flexible display apparatus which facilitates to maintain a plane state in a bending display area of a flexible display panel being unfolded. In one embodiment, the flexible display apparatus comprises a flexible display panel including a non-bendable area and a bendable area. The flexible display apparatus also has a supporting frame, comprising a bending member supporting a bendable area of the flexible display panel and configured to be bent. The supporting frame also comprises a plurality of supporting members supporting the non-bendable area of the flexible display panel. Each of the plurality of supporting members connects to a plurality of connecting surfaces of the bending member. The flexible display apparatus further comprises a back cover attached to a back of the supporting frame, and a front cover configured to couple to the back cover to enclose the flexible display panel and the supporting frame.

Additional advantages and features of embodiments of the disclosure will be set forth in part in the description which follows and in part will become apparent to those having ordinary skill in the art upon examination of the following or may be learned from practice of embodiments of the disclosure. The objectives and other advantages of embodiments of the disclosure may be realized and attained by the structure particularly pointed out in the written description and claims hereof as well as the appended drawings.

It is to be understood that both the foregoing general description and the following detailed description of embodiments of the present disclosure are exemplary and explanatory and are intended to provide further explanation of the invention as claimed.

BRIEF DESCRIPTION OF THE DRAWINGS

The accompanying drawings, which are included to provide a further understanding of embodiments of the disclosure and are incorporated in and constitute a part of this application, illustrate embodiment(s) of the disclosure and together with the description serve to explain the principle of embodiments of the disclosure. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a supporting frame for a flexible display and a flexible display apparatus comprising the same will be described in detail with reference to the accompanying drawings. Wherever possible, the same reference numbers will be used throughout the drawings to refer to the same or like parts. Also, in the following description, if detailed description of elements or functions known in respect of the present disclosure is determined to make the subject matter of the present disclosure unnecessarily obscure, the detailed description will be omitted.

Figure 1:
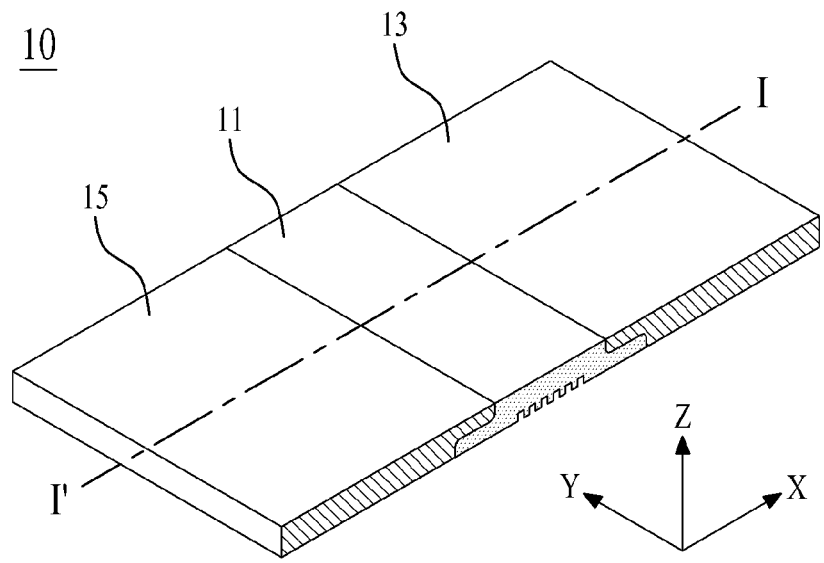
FIG. 1 is a front perspective view illustrating a supporting frame for flexible display according to the first embodiment of the present disclosure.
Figure 2:
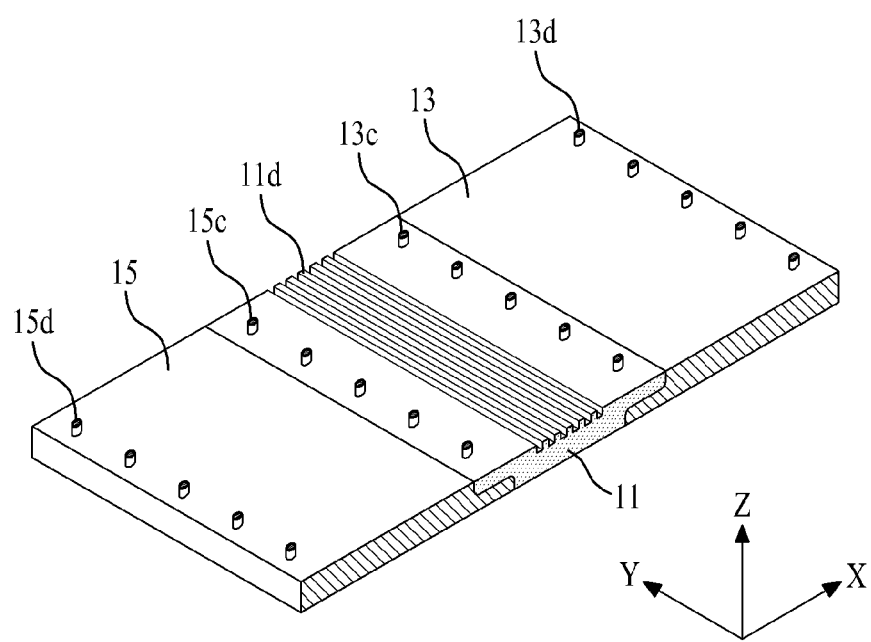
FIG. 2 is a rear perspective view illustrating the supporting frame for flexible display according to the first embodiment of the present disclosure.
Figure 3:
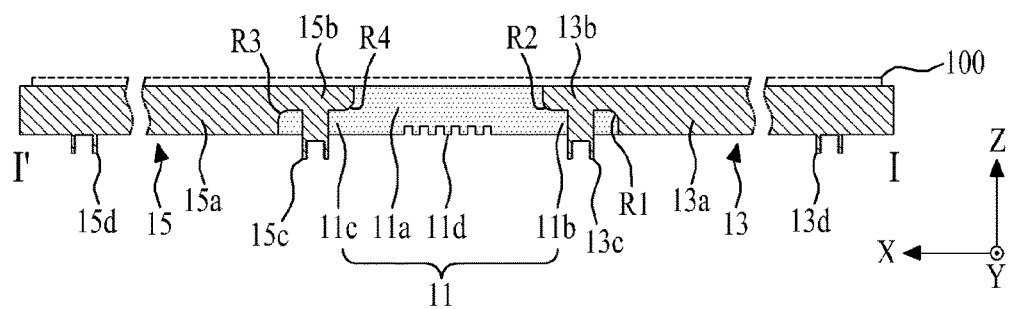
FIG. 3 is a cross sectional view along I-I' line of FIG. 1.

FIG. 1 is a front perspective view illustrating a supporting frame for a flexible display according to a first embodiment of the present disclosure. FIG. 2 is a rear perspective view illustrating the supporting frame for flexible display according to the first embodiment of the present disclosure. FIG. 3 is a cross sectional view along I-I' of FIG. 1.

As shown in FIGS. 1 to 3, the supporting frame for flexible display 10 (hereinafter, referred to as 'panel supporting frame 10') according to the first embodiment of the present disclosure includes a bending member 11, a first supporting member 13 and a second supporting member 15. The panel supporting frame 10 is connected with a rear surface of a flexible display panel 100 including a bending display area (BDA). The panel supporting frame 10 supports the flexible display panel 100 which is folded with respect to the bending display area BDA or unfolded in a plane state.

The bending member 11 supports the bending display area (BDA) of the flexible display panel 100, and the bending member 11 guides the bending display area (BDA) of the flexible display panel 100 to be bent with a predetermined curvature. The bending member 11 is not adhered to the flexible display panel 100 by the use of adhesive member such as adhesive or double-sided tape. The bending member 11 serves as a supporter for supporting a panel bending portion overlapped with the bending display area (BDA) of the flexible display panel 100. To this end, the bending member 11 may include any one material or two or more materials of flexible materials, for example, rubber, silicon, polyurethane and polyvinyl chloride.

The bending member 11 according to the first example may include a body 11a, a first outer protrusion 11b and a second outer protrusion 11c.

The body 11a is overlapped with the bending display area (BDA) of the flexible display panel 100, wherein the body 11a supports the bending display area (BDA) of the flexible display panel 100 or guides the bending of the bending display area (BDA). The body 11a according to one example may include a bending portion (A) and first and second bending buffers (B1, B2).

The bending portion (A) is defined with the center of the body 11a, and is overlapped with the bending display area (BDA) of the flexible display panel 100. The bending portion (A) is formed of a flexible material so that the bending portion (A) is bent in accordance with the bending of the bending display area (BDA). A length of the bending portion (A) may be set to be approximately equivalent to a length of the bending display area (BDA) defined in the flexible display panel 100 with respect to a length direction (X) of the flexible display panel 100, or may be set in accordance with the bending curvature of the bending display area (BDA). For example, a first length of the bending portion (A) is set in proportion to a length of the body 11a. A maximum length of the bending portion (A) may be set to be greater than or equal to 30% of the length of the body 11a, so as to provide smooth curvature, and less than 180% of the length of the body 11a, so as to maintain stiffness of the bending member 11.

The first and second bending buffers (B1, B2) are bending buffer areas, wherein the first and second bending buffers (B1, B2) are prepared on either side of the bending portion (A), in parallel to one other. The first and second bending buffers (B1, B2) may be overlapped with inner sides of display areas (DA1, DA2) that are in contact with the bending display area (BDA) of the flexible display panel 100. The first bending buffer (B1) is prepared at one side of the body 11a, that is, one side of the bending portion (A), and the second bending buffer (B2) is prepared at the other side of the body 11a, that is, the other side of the bending portion (A). In this case, a second length of each of the first and second bending buffers (B1, B2) is set within a range of 10%~70% of the length of the bending portion (A) so as to maintain stiffness of the bending member 11, preferably. Each of the first and second bending buffers (B1, B2) is formed of a flexible material so that it is possible to maintain the smooth curvature of the bending display area (BDA) when the flexible display panel 100 is bent.

The first outer protrusion 11b is prepared at one side of the body 11a, and is overlapped with the first supporting member 13. The first outer protrusion 11b according to one example protrudes toward the first supporting member 13 and has a predetermined length from one side of the body 11a, and, more particularly, from a lower portion of the one side of the body 11a. The protruding first outer protrusion 11b is overlapped with an inner side of the first supporting member 13.

The second outer protrusion 11c is prepared at the other side of the body 11a. With the body 11a provided between the first outer protrusion 11b and the second outer protrusion 11c, the second outer protrusion 11c is provided in parallel to the first outer protrusion 11b, and is overlapped with the second supporting member 15. The second outer protrusion 11c according to one example protrudes toward the second supporting member 15 and has a predetermined length from the other side of the body 11a, and, more particularly, from a lower portion of the other side of the body 11a. The protruding second outer protrusion 11c is overlapped with an inner side of the second supporting member 15.

The bending member 11 according to the first embodiment of the present disclosure may further include a length compensation pattern 11d prepared in a lower surface of the body 11a opposite to an upper surface of the body 11a, wherein the upper surface of the body 11a directly confronts the flexible display panel 100.

The length compensation pattern 11d may be an uneven pattern with a plurality of hollows in the lower surface of the body 11a, wherein the plurality of hollows included in the uneven pattern may be provided at fixed intervals along a length direction X (or a short-side direction) of the body 11a while being in parallel to a width direction Y (or a long-side direction) of the body 11a. The uneven pattern 11d according to one example may include a plurality of slits, wherein each of the slits may have a predetermined width, and the plurality of slits included in the uneven pattern 11d may be provided in parallel to the long side of the body 11a and are provided in the lower surface of the bending portion (A). The length compensation pattern 11d reduces tensile or compressive forces on the lower surface of the body 11a when the flexible display panel 100 is bent because intervals between the adjacent slits change to compensate for length changes due to the folding. The length compensation member therefore reduces wrinkling of the bending display area (BDA), and allows the bending display area (BDA) of the flexible display panel 100 to bend to the predetermined curvature. A width and depth of each of the slits may be set in accordance with the bending curvature of the bending display area (BDA).

The length compensation pattern 11d may alternatively be prepared in the upper surface of the body 11a, that is, a supporting surface of the body 11a for supporting the bending display area (BDA) of the flexible display panel 100. In this case, the uneven pattern may cause different touch sensations on the bending display area than on the first and second display areas DA1 and DA2. Accordingly, the length compensation pattern 11d is prepared in the lower surface of the body 11a, preferably.

The first supporting member 13, which is connected with one side of the bending member 11, supports the first display area (DA1) of the flexible display panel 100. The inner lateral side of the first supporting member 13 and one side of the bending member 11 are overlapped with each other, and the first supporting member 3 is physically connected with a plurality of surfaces of the bending member 11 as one body. Also, the first supporting member 13 is physically connected with a first panel rear portion of the flexible display panel 100 overlapped with the first display area (DA1) of the flexible display panel 100, whereby the first panel rear portion is maintained in the plane state. To this end, the first supporting member 13 is formed of a rigid material whose stiffness is relatively higher than that of the bending member 11, for example, plastic material or metal material.

The first supporting member 13 according to one example may include a first base plate 13a and a first inner protrusion 13b.

The first base plate 13a is overlapped with the first display area (DA1) of the flexible display panel 100, wherein the first base plate 13a supports the first panel rear portion of the flexible display panel 100. In this case, the first base plate 13a may be physically connected with the first panel rear portion by the use of adhesive member (not shown). An inner lateral side of the first base plate 13a which directly confronts the first outer protrusion 11b of the bending member 11 is physically connected with a lateral side of the first outer protrusion 11b.

The first inner protrusion 13b is prepared at an inner lateral side of the first base plate 13a, overlapped with the first outer protrusion 11b of the bending member 11, and physically connected with the upper surface of the first outer protrusion 11b and one lateral side of the body 11a. The first inner protrusion 13b, which protrudes toward the bending member 11, has a predetermined length from the inner lateral side of the first base plate 13a, and more particularly, an upper portion of the inner lateral side of the first base plate 13a, and then the protruding first inner protrusion 13b is overlapped with the first outer protrusion 11b of the bending member 11. In this case, the first inner protrusion 13b and the first outer protrusion 11b may have the same length. A length in each of the first inner protrusion 13b and the first outer protrusion 11b may be set to be 10% or more than 10% of the length of the bending portion (A) so as to secure a sufficient attachment area (or bonding area) between the bending member 11 and the first supporting member 13, and also to prevent a separation even in a repetitive folding.

The first supporting member 13 according to one example may further include first and second rounding portion (R1, R2) prepared at corners of the first inner protrusion 13b connected with the bending member 11.

The first rounding portion (R1) is prepared with a predetermined curvature at the corner between the first base plate 13a and the first inner protrusion 13a. The first second rounding portion (R2) is prepared with a predetermined curvature at the corner of the first inner protrusion 13b corresponding to the corner between the body 11a of the bending member 11 and the first outer protrusion 11b. The first and second rounding portions (R1, R2) increase the attachment area between the bending member 11 and the first supporting member 13, to thereby enhance an adhesive strength between the bending member 11 and the first supporting member 13.

The second supporting member 15, which is connected with the other side of the bending member 11, supports the second display area (DA2) of the flexible display panel 100.

The inner lateral side of the second supporting member 15 and the other side of the bending member 11 are overlapped with each other, and the second supporting member 15 is physically connected with a plurality of surfaces of the bending member 11 as one body. Also, the second supporting member 15 is physically connected with a second panel rear portion of the flexible display panel 100 overlapped with the second display area (DA2) of the flexible display panel 100, whereby the second panel rear portion is maintained in the plane state. To this end, the second supporting member 15 may be formed of the same rigid material as that of the first supporting member 13, and the second supporting member 15 may be symmetrical to the first supporting member 13 with respect to the center of the bending portion (A).

The second supporting member 15 according to one example may include a second base plate 15a and a second inner protrusion 15b.

The second base plate 15a is overlapped with the second display area (DA2) of the flexible display panel 100, wherein the second base plate 15a supports the second panel rear portion of the flexible display panel 100. In this case, the second base plate 15a may be physically connected with the second panel rear portion by the use of adhesive member (not shown). An inner lateral side of the second base plate 15a which directly confronts the second outer protrusion 11c of the bending member 11 is physically connected with a lateral side of the second outer protrusion 11c.

The second inner protrusion 15b is prepared at an inner lateral side of the second base plate 15a, overlapped with the second outer protrusion 11c of the bending member 11, and physically connected with the upper surface of the second outer protrusion 11c and the other side of the body 11a. The second inner protrusion 15b protrudes toward the bending member 11 and has a predetermined length from the inner lateral side of the second base plate 15a, and, more particularly, from an upper portion of the inner lateral side of the second base plate 15a. The protruding second inner protrusion 15b is overlapped with the second outer protrusion 11c of the bending member 11. In this case, the second inner protrusion 15b and the second outer protrusion 11c may have the same length.

The first supporting member 15 according to one example may further include third and fourth rounding portions (R3, R4) prepared at corners of the second inner protrusion 15b connected with the bending member 11.

The third rounding portion (R3) is prepared with a predetermined curvature at the corner between the second base plate 15a and the second inner protrusion 15a. The fourth rounding portion (R4) is prepared with a predetermined curvature at the corner of the second inner protrusion 15b corresponding to the corner between the body 11a of the bending member 11 and the second outer protrusion 11c. The third and fourth rounding portions (R3, R4) increase the attachment area between the bending member 11 and the second supporting member 15 formed of the different materials, to thereby enhance an adhesive strength between the bending member 11 and the second supporting member 15.

Additionally, the panel supporting frame 10 according to the first embodiment of the present disclosure may further include a plurality of first to fourth bosses 13c, 15c, 13d and 15d.

The first boss 13c protrudes out of the first supporting member 13 and supports one side of the bending member 11. That is, the plurality of first bosses 13c, which pass through the first outer protrusion 11b of the bending member 11, are provided at fixed intervals in the lower surface of the first inner protrusion 13b. The plurality of first bosses 13c protrude out of the lower surface of the first outer protrusion 11b, wherein each of the plurality of first bosses 13c may have a cylinder shape. Each of the plurality of first bosses 13c may include a screw hole prepared in the center at its lower end. According as the plurality of first bosses 13c vertically penetrate through the first outer protrusion 11b of the bending member 11, each of the plurality of first bosses 13c serves as a folding reference point to make the bending member 11 and/or first supporting member 13 folded without twists when the panel supporting frame 10 is folded. Also, each of the plurality of first bosses 13c is connected with a housing (or set structure, not shown) by a coupling member (not shown) such as a screw coupled with the screw hole, whereby each of the plurality of first bosses 13c connects the inner lateral side of the first supporting member 13 with the housing. In this case, the housing may be defined with a structure for receiving the panel supporting frame 10 connected with the rear surface of the flexible display panel 100.

The second boss 15c protrudes out of the second supporting member 15 and supports the other side of the bending member 11. That is, the plurality of second bosses 15c, which pass through the second outer protrusion 11c of the bending member 11, are provided at fixed intervals in the lower surface of the second inner protrusion 15b. The plurality of second bosses 15c protrude out of the lower surface of the second outer protrusion 11c, wherein each of the plurality of second bosses 15c may have a cylinder shape. Each of the plurality of second bosses 15c may include a screw hole prepared in the center at its lower end. According as the plurality of second bosses 15c vertically penetrate through the second outer protrusion 11c of the bending member 11, each of the plurality of second bosses 15c serves as a folding reference point to make the bending member 11 and/or second supporting member 15 folded without twists when the panel supporting frame 10 is folded. Also, each of the plurality of second bosses 15c is connected with a housing by a coupling member (not shown) such as a screw coupled with the screw hole, whereby each of the plurality of second bosses 15c connects the inner lateral side of the second supporting member 15 with the housing.

The plurality of third bosses 13d protrude from the first supporting member 13. That is, the plurality of third bosses 13d are vertically prepared at fixed intervals from the lower portion of the outer lateral side of the first base plate 13a. Each of the plurality of third bosses 13d may have a cylinder shape. Each of the plurality of third bosses 13d may include a screw hole prepared in the center at its lower end. Each of the plurality of third bosses 13d is connected with a housing by a coupling member (not shown) such as a screw coupled with the screw hole, whereby each of the plurality of third bosses 13d connects the outer lateral side of the first supporting member 13 with the housing.

The plurality of fourth bosses 15d protrude from the second supporting member 15. That is, the plurality of fourth bosses 15d are vertically prepared at fixed intervals from the lower surface of the outer lateral side of the second base plate 15a. Each of the plurality of fourth bosses 15d may have a cylinder shape. Each of the plurality of fourth bosses 15d may include a screw hole prepared in the center at its lower end. Each of the plurality of fourth bosses 15d is connected with a housing by a coupling member (not shown) such as a screw coupled with the screw hole, whereby each of the plurality of fourth bosses 15d connects the outer lateral side of the second supporting member 15 with the housing.

The bending member 11 and the first and second supporting member 13 and 15 may be formed as one body by an insert injection method or double injection method using both flexible and rigid materials. Accordingly, in case of the panel supporting frame 10 according to the first embodiment of the present disclosure, the first and second supporting members 13 and 15 formed of the hard material are overlapped with and connected with both sides of the bending member 11 formed of the flexible material, thereby providing a flexible material portion M1, a heterogeneous material portion M2 and a hard material portion M3.

The flexible material portion M1 is a single material portion defined by the body 11a of the bending member 11, wherein the flexible material portion M1 for supporting the bending display area (BDA) of the flexible display panel 100 is bent in accordance with the bending of the bending display area (BDA).

The heterogeneous material portion M2 corresponds to a combined portion of the flexible material and the hard material, that is, an overlapped portion between the bending member 11 and each of the first and second supporting member 13 and 15. The heterogeneous material portion M2 reduces differences between touch sensations on the portion of the display overlapping the rigid material and touch sensations on the portion of the display overlapping the flexible material. The heterogeneous material portion M2 also increases an attachment area between the flexible material and the hard material, to thereby enhance manufacturability and adhesiveness between the flexible material and the hard material.

The rigid material portion M3 is a single material portion defined by the base plates 13a and 15a of the first and second supporting members 13 and 15, wherein the rigid material portion M3 secures rigidity of the flexible display panel 100 and maintains flatness of the flexible display panel 100.

In case of the panel supporting frame 10 according to the first embodiment of the present disclosure, the attachment area between the bending member 11 and the supporting members 13 and 15 is largely increased owing to the connection portion formed by overlapping and connecting the bending member 11 of the flexible material and each of the first and supporting member 13 and 15 of the rigid material, whereby it is possible to prevent the bending member 11 and the supporting members 13 and 15 from being separated from each other even in case of the repetitive folding and unfolding. Also, the panel supporting frame 10 according to the first embodiment of the present disclosure is physically connected with the lower surface of the flexible display panel 100 so that it is possible to maintain rigidity of the flexible display panel 100, to stably protect the flexible display panel 100 even when the flexible display panel 100 is repetitively folded, to maintain the bending curvature of the bending display area (BDA) when the flexible display panel 100 is folded, and to maintain the flexible display panel 100 in the plane state by the stable supporting of the bending display area (BDA) when the flexible display panel 100 is unfolded. The panel supporting frame 10 according to the first embodiment of the present disclosure is physically connected with and formed as one body with the lower surface of the flexible display panel 100 except the bending display area (BDA) so that it is possible to facilitate a transfer of the flexible display panel 100, and to improve an assembly between the flexible display panel 100 and the housing.

Figure 4:
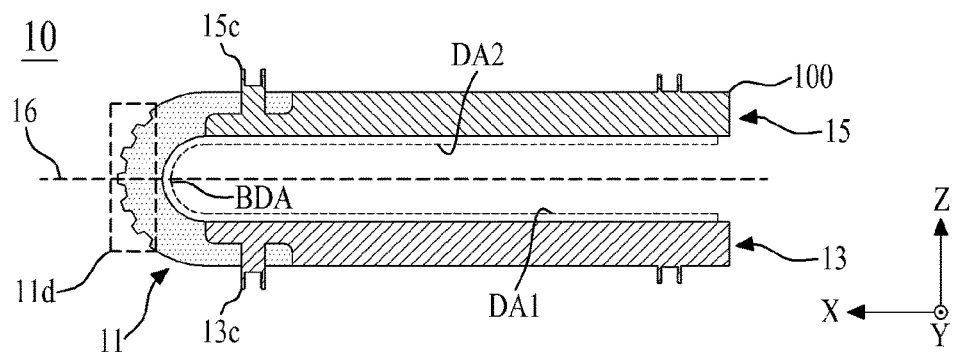
FIG. 4 shows an inside bending state of panel supporting frame according to the first embodiment of the present disclosure.

FIG. 4 shows an inside bending state of the panel supporting frame according to the first embodiment of the present disclosure.

Referring to FIG. 4, in case of the panel supporting frame 10 according to the first embodiment of the present disclosure, the first and second supporting members 13 and 15 of the rigid material are respectively overlapped with and connected with both sides of the bending member 11 of the flexible material, whereby the flexible display panel 100 is bent in an inside bending method through the bending of the bending member 11 around a bending line 16 passing through the bending member 11. In this case, the inside bending method indicates that the first and second display areas DA1 and DA2 directly confront each other when the flexible display panel 100 is folded. For example, in case of the panel supporting frame 10, the second supporting member 15 is folded onto the first supporting member 13 by the inside bending of the bending member 11 so that the first and second display areas DA1 and DA2 of the flexible display panel 100 directly face each other.

The bosses 13c and 15c prepared in the first and second supporting members 13 and 15 allow the flexible display panel 100 to fold without twists. When the flexible display panel 100 is folded, the interval between the adjacent slits prepared in the length compensation pattern 11d of the bending member 11 is increased in accordance with a tensile force occurring in the lower surface of the bending member 11 so that a length change of the bending member 11 is compensated, and thus the bending display area (BDA) of the flexible display panel 100 is bent in accordance with the smooth curvature without wrinkles.

Accordingly, the panel supporting frame 10 guides the folding of the flexible display panel 100 by the inside bending method so that it is possible to prevent the folded flexible display panel 100 from being exposed to the outside, and to protect the folded flexible display panel 100 from an external shock.

Figure 5:
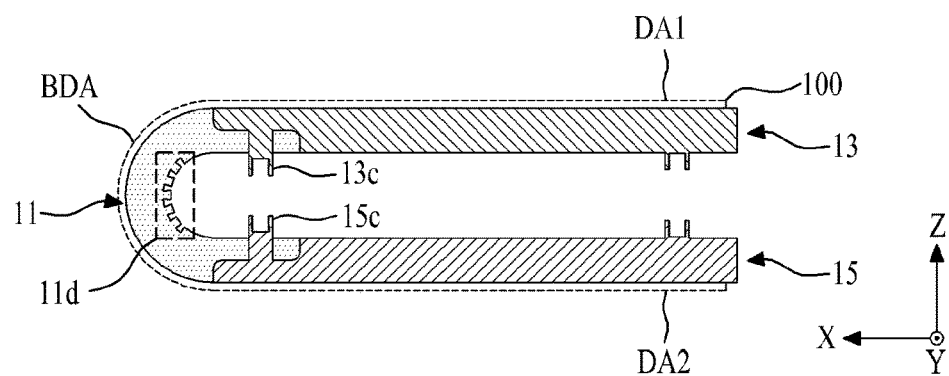
FIG. 5 shows an outside bending state of panel supporting frame according to the first embodiment of the present disclosure.

FIG. 5 shows an outside bending state of the panel supporting frame according to the first embodiment of the present disclosure.

Referring to FIG. 5, in case of the panel supporting frame 10 according to the first embodiment of the present disclosure, the first and second supporting members 13 and 15 of the rigid material are respectively overlapped with and connected with both sides of the bending member 11 of the flexible material, whereby the flexible display panel 100 is bent in an outside bending method through the bending of the bending member 11. In this case, the outside bending method indicates that the first and second display areas DA1 and DA2 of the flexible display panel 100 face toward the outside without confronting each other. For example, in case of the panel supporting frame 10, the second supporting member 15 is folded to be positioned under the first supporting member 13 by the outside bending of the bending member 11 so that the first and second display area DA1 and DA2 of the flexible display panel 100 face toward the outside without directly confronting each other.

The bosses 13c and 15c prepared in the first and second supporting members 13 and 15 allow the flexible display panel 100 to fold without twists. When the flexible display panel 100 is folded, the interval between the adjacent slits prepared in the length compensation pattern 11d of the bending member 11 is decreased in accordance with a compression occurring in the lower surface of the bending member 11 so that a length change of the bending member 11 is compensated, and thus the bending display area (BDA) of the flexible display panel 100 is bent in accordance with the smooth curvature without wrinkles.

Accordingly, the panel supporting frame 10 guides the folding of the flexible display panel 100 by the outside bending method so that an image is displayed on at least any one of the bending display area (BDA) and the first and second display areas DA1 and DA1 of the folded flexible display panel 100.

As a result, the panel supporting frame 10 according to the first embodiment of the present disclosure may be bent in both sides through the use of the bending member 11 of the flexible material.

FIGS. 6A to 6F are cross sectional views illustrating various modified examples of the bending member in the panel supporting frame according to the first embodiment of the present disclosure, which are obtained by changing the lower surface of the bending member shown in FIGS. 1 to 5. Accordingly, only the lower surface of the bending member will be described in detail as follows.

Figure 6A:
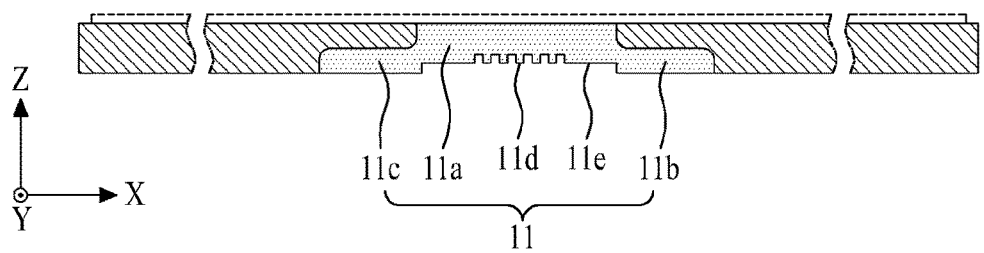
FIGS. 6A to 6F are cross sectional views illustrating various modified examples of bending member in the panel supporting frame according to the first embodiment of the present disclosure.

First, as shown in FIG. 6A, the bending member 11 according to the first modified example may further include a hollow 11e prepared in the lower surface of the body 11a.

The hollow 11e is provided with a predetermined depth from the lower surface of the body 11a between the first and second outer protrusions 11b and 11c. Accordingly, a lower surface of the hollow 11e is stepped from the lower surface of each of the first and second outer protrusions 11b and 11c, and the lower surface of each of the first and second outer protrusion 11b and 11 c is protruding out of the lower surface of the hollow 11e. The length compensation pattern 11d is prepared in the lower surface of the hollow 11e. The hollow 11e reduces a thickness of the body 11a so that it is possible to decrease a length change in the lower surface of the body 11a, wherein the length change might occur in accordance with the bending of the bending member 11.

Figure 6B:
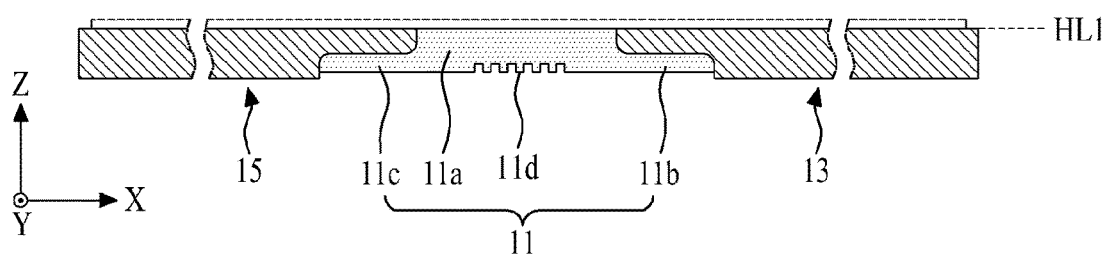

As shown in FIG. 6B, in case of the bending member 11 according to the second modified example, the lower surfaces of the body 11a and the first and second outer protrusions 11b and 11c are stepped from the lower surfaces of the first and second supporting members 13 and 15. That is, in case of the bending member 11 according to the second modified example, the upper surface of the body 11a and the upper surfaces of the first and second supporting members 13 and 15 are positioned in the same horizontal line HL1. The lower surfaces of the body 11a and the first and second outer protrusions 11b and 11 c are positioned in the same horizontal line. However, the lower surfaces of the body 11a and the first and second outer protrusions 11b and 11c are stepped from the lower surfaces of the first and second supporting members 13 and 15, wherein the lower surfaces of the body 11a and the first and second outer protrusions 11b and 11c are not protruding out of the lower surfaces of the first and second supporting members 13 and 15. Accordingly, a thickness of the bending member 11 according to the second modified example is smaller than a thickness of each of the first and second supporting members 13 and 15 so that it is possible to decrease a length change in the lower surface of the body 11a when the bending member 11 is bent.

Figure 6C:
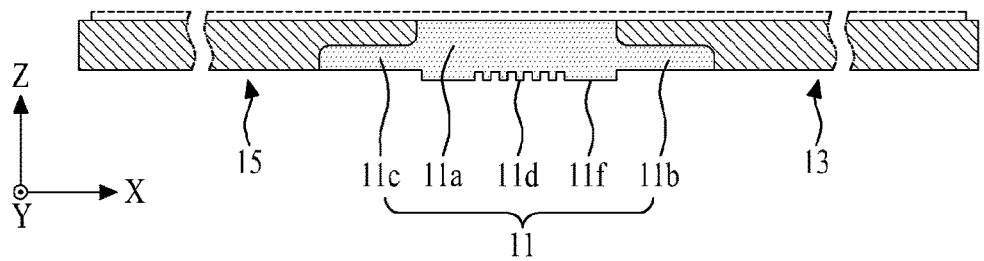

As shown in FIG. 6C, the bending member 11 according to the third modified example may further include a lower surface protruding portion 11f prepared in the lower surface of the body 11a.

The lower surface protruding portion 11f protrudes to have a predetermined thickness (or height) from the lower surface of the body 11a. The lower surface protruding portion 11f protrudes out of the lower surface of each of the first and second supporting members 13 and 15. Also, the aforementioned length compensation pattern 11d is prepared in the lower surface of the lower surface protruding portion 11f. The lower surface protruding portion 11f increases a thickness of the body 11a so that it is possible to reduce differences between touch sensations over the first and second supporting members 13 and 15 and touch sensations over the bending member 11.

Figure 6D:
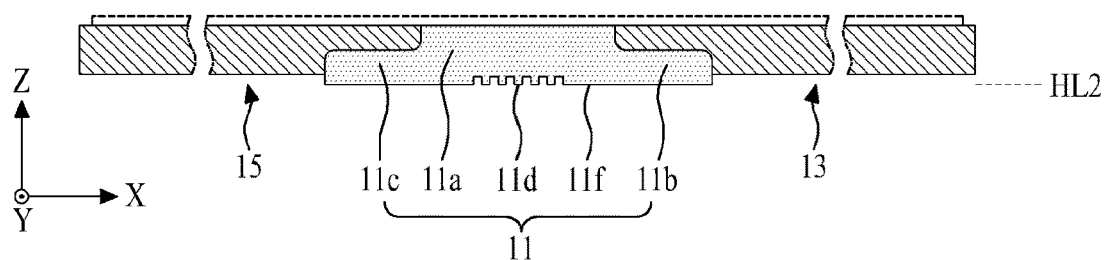

Additionally, as shown in FIG. 6D, the lower surface protruding portion 11f may be additionally protruding from the lower surface of each of the first and second outer protrusions 11b and 11c. That is, the lower surfaces of the body 11a and the first and second outer protrusions 11b and 11c are positioned in the same horizontal line HL2, and the lower surfaces of the body 11a and the first and second outer protrusions 11b and 11c protrude out of the lower surfaces of the first and second supporting members 13 and 15.

Figure 6E:
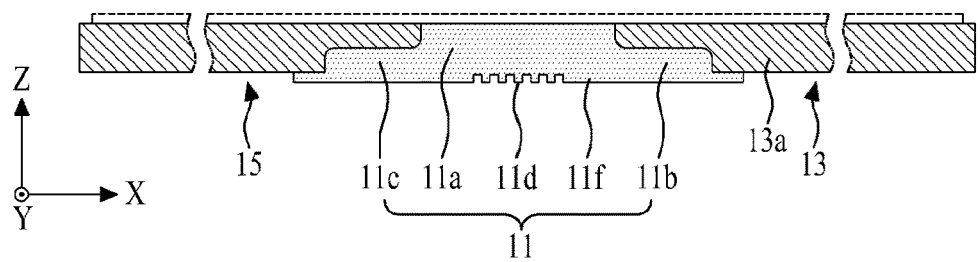

In another example, as shown in FIG. 6E, the lower surface protruding portion 1 if may overlap the lower edge of each of the first and second supporting members 13 and 15 respectively connect to the lateral sides of the first and second outer protrusions 11b and 11c. In this case, the lower surface protruding portion 11f may increase an attachment area between the bending member 11 and each of the first and second supporting members 13 and 15. Additionally, the lower surface protruding portion 1 if may cover the entire lower surface of each of the first and second supporting members 13 and 15.

Figure 6F:
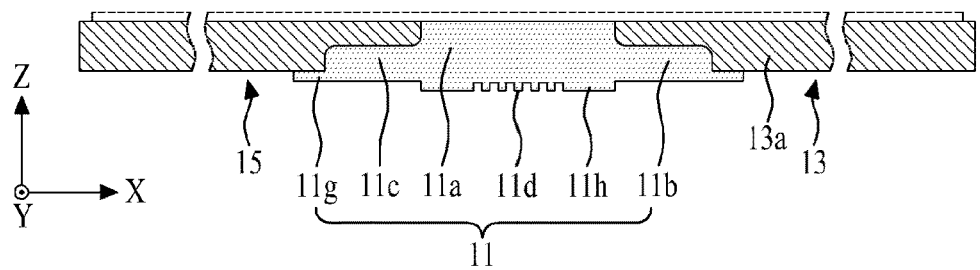

As shown in FIG. 6F, the bending member 11 according to the modified fourth example may further include first and second lower protruding portions 11g and 11h.

The first lower protruding portion 11g covers the lower surface of each of the body 11a and the first and second outer protrusions 11b and 11c, and also covers the lower edge of each of the first and second supporting members 13 and 15. The first lower protruding portion 11g increases a thickness of the body 11a, reducing differences between touch sensations on the bending display area and touch sensations on the first and second display areas DA1 and DA2. The first lower protruding portion 11g also increases an attachment area between the bending member 11 and each of the first and second supporting members 13 and 15.

The second lower protruding portion 11h protrudes to have a predetermined thickness (or height) from the lower surface of the first lower protruding portion 11g overlapped with the body 11a. Also, the aforementioned length compensation pattern 11d is prepared in the lower surface of the second lower protruding portion 11h. The second lower protruding portion 11h increases a thickness of the body 11a so that it is possible to reduce differences between touch sensations over the first and second supporting members 13 and 15 and touch sensations over the bending member 11.

Figure 7:
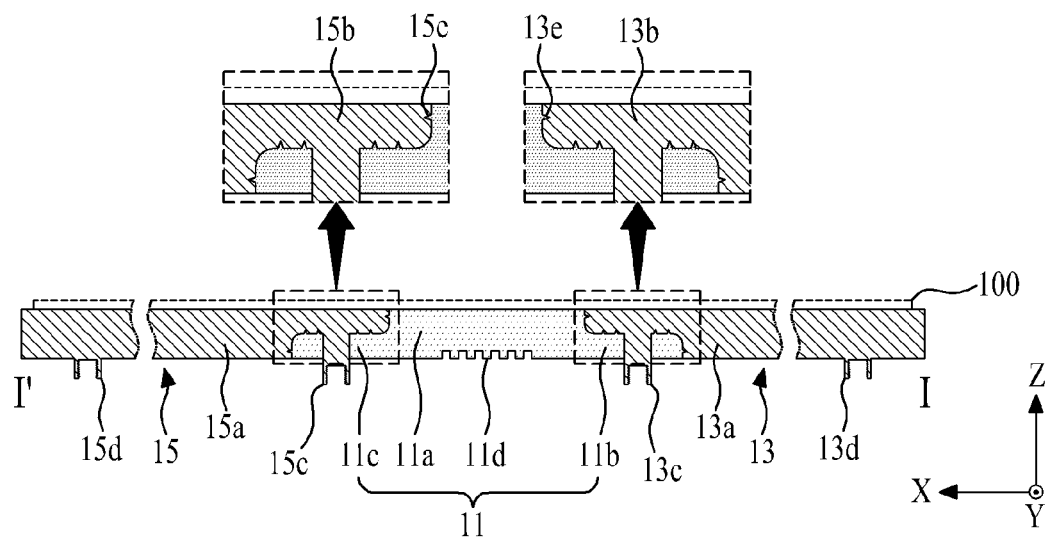
FIG. 7 is a cross sectional view illustrating a panel supporting frame according to the second embodiment of the present disclosure.

FIG. 7 is a cross sectional view illustrating a panel supporting frame according to a second embodiment of the present disclosure.

Referring to FIG. 7, the panel supporting frame 10 according to the second embodiment of the present disclosure may include a bending member 11, first and second supporting members 13 and 15, and first and second roughness patterns 13e and 15e.

The bending member 11 and the first and second supporting member 13 and 15 shown in FIG. 7 are similar to those of FIGS. 1 to 5, whereby the same reference numbers will be used throughout the drawings to refer to the same or like parts, and a detailed description for the same parts will be omitted.

The first roughness pattern 13e is prepared in an attachment surface between the bending member 11 and the first supporting member 13. That is, the first roughness pattern 13e is provided with a spike pattern on the attachment surface of the first supporting member 13 in contact with the bending member 11. The first roughness pattern 13e increases a surface area of the attachment surface of the first supporting member 13 in contact with the bending member 11, thereby increasing an attachment area between the bending member 11 and the first supporting member 13. The first roughness pattern 13e according to one example may be a spike pattern with a plurality of triangle-shaped spikes extending from a surface of the first supporting member 13, but the first roughness pattern 13w is not limited to this shape. For example, the first roughness pattern 13e may have one or more spikes extending from the surface of the first supporting member 13 and having any polygonal or curved cross section shape increasing the surface area of the first supporting member 13 in contact with the bending member 11. The first roughness pattern 13e may alternatively be a spike pattern extending from a surface of the first outer protrusion 11b.

The second roughness pattern 15e is prepared in an attachment surface between the bending member 11 and the second supporting member 15. That is, the second roughness pattern 15e is provided with a spike pattern on the attachment surface of the second supporting member 15 in contact with the bending member 11. The second roughness pattern 15e increases a surface area of the attachment surface of the second supporting member 15 in contact with the bending member 11, thereby increasing an attachment area between the bending member 11 and the second supporting member 15. A shape of the second roughness pattern 15e according to one example may be similar to the shape of the first roughness pattern 13e.

Accordingly, in case of the panel supporting member 10 according to the second embodiment of the present disclosure, an adhesive strength between the bending member 11 and the supporting member 13 and 15 is enhanced in accordance with the increase of the attachment area between the bending member 11 and the supporting member 13 and 15 by the use of first and second roughness patterns 13e and 15e. This enhanced adhesive strength reduces the likelihood of separation between the bending member 11 and the supporting member 13 and 15 even when the bending member 11 is repetitively folded and unfolded.

Additionally, the lower surface of the bending member 11 in the panel supporting member 10 according to the second embodiment of the present disclosure may be changed to the shapes shown in FIGS. 6A to 6F.

Figure 8:
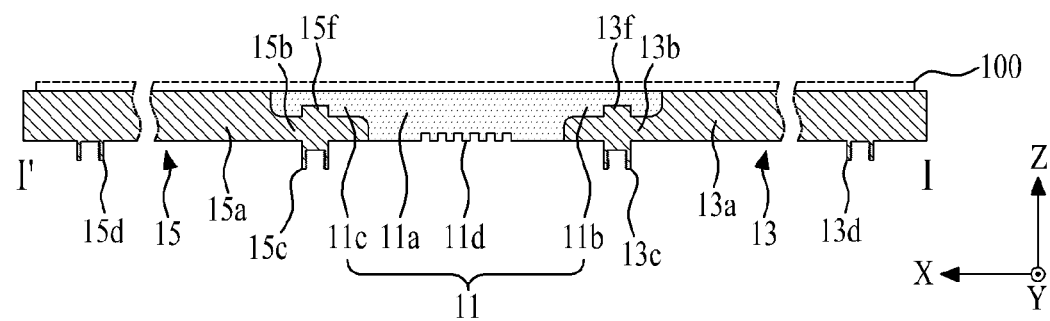
FIG. 8 is a cross sectional view illustrating a panel supporting frame according to the third embodiment of the present disclosure.

FIG. 8 is a cross sectional view illustrating a panel supporting member according to a third embodiment of the present disclosure, which is obtained by changing a connection structure between the bending member and the supporting member in the panel supporting frame according to the first embodiment of the present disclosure. Accordingly, only the connection structure between the bending member and the supporting member will be described in detail as follows.

Referring to FIG. 8, the connection structure between the bending member and the supporting member in the panel supporting frame according to the third embodiment of the present disclosure is opposite to the connection structure between the bending member and the supporting member in the panel supporting frame according to the first embodiment of the present disclosure. This connection structure is appropriate for the outside bending method of the flexible display panel 100.

In detail, the panel supporting frame 10 according to the third embodiment of the present disclosure may include a bending member 11, and first and second supporting members 13 and 15.

As described above, the bending member 11 may include a body 11a, a first outer protrusion 11b, a second outer protrusion 11c and a length compensation pattern 11d. Except that the first outer protrusion 11b protrudes from an upper portion of one lateral side of the body 11a toward the first supporting member 13, and the second outer protrusion 11c protrudes from an upper portion of the other lateral side of the body 11a toward the second supporting member 15, the bending member 11 of FIG. 8 is similar to the bending member of FIG. 3, whereby a detailed description for the same parts will be omitted.

The first and second outer protrusions 11b and 11c together with the body 11a support a bending display area of a flexible display panel 100, and guide the bending of the bending display area.

As described above, the first supporting member 13 may include a first base plate 13a, a first inner protrusion 13b, and a plurality of first and third bosses 13c and 13d. Except that the first inner protrusion 13b protrudes from a lower portion of an inner lateral side of the first base plate 13a toward the bending member 11, and the plurality of first bosses 13c protrude out of the lower surface of the first inner protrusion 13b, the first supporting member 13 of FIG. 8 is similar to the first supporting member of FIG. 3, whereby a detailed description for the same parts will be omitted.

The first supporting member 13 may further include a plurality of first fixed protrusions 13f vertically protruding at a predetermined interval from the first inner protrusion 13b toward the first outer protrusion 11b. Each of the plurality of first fixed protrusions 13f is inserted into the first outer protrusion 11b of the bending member 11 so that each of the plurality of first fixed protrusions 13f serves as a folding reference point to allow the first supporting member 13 to fold without twists.

As described above, the second supporting member 15 may include a second base plate 15a, a second inner protrusion 15b, and second and fourth bosses 15c and 15d. Except that the second inner protrusion 15b protrudes from a lower portion of an inner lateral side of the second base plate 15a toward the bending member 11, and the plurality of second bosses 15c protrude out of the lower surface of the second inner protrusion 15b, the second supporting member 15 of FIG. 8 is similar to the first supporting member of FIG. 3, whereby a detailed description for the same parts will be omitted.

The second supporting member 15 may further include a plurality of second fixed protrusions 15f vertically protruding at a predetermined interval from the second inner protrusion 15b toward the second outer protrusion 11c. Each of the plurality of second fixed protrusions 15f is inserted into the second outer protrusion 11c of the bending member 11 so that each of the plurality of second fixed protrusions 15f serves as a folding reference point to allow the second supporting member 15 to fold without twists.

In case of the panel supporting frame 10 according to the third embodiment of the present disclosure, the bending member 11 of the flexible material and each of the first and supporting member 13 and 15 of the rigid material are overlapped and connected with each other so that it is possible to provide the same effect as that of the panel supporting frame according to the first embodiment of the present disclosure. Especially, in case of the panel supporting frame 10 according to the third embodiment of the present disclosure, the entire portions of the bending member 11 support the entire flexible display panel 100, that is, it is appropriate for the folding and unfolding of the flexible display panel 100 by the outside bending method.

Additionally, the panel supporting frame 10 according to the third embodiment of the present disclosure may further include roughness patterns 13e and 15e shown in FIG. 8 so as to increase an attachment area between the bending member 11 of the flexible material and the first and second supporting members 13 and 15 of the rigid material.

Also, the upper surface and/or lower surface of the bending member 11 in the panel supporting frame 10 according to the third embodiment of the present disclosure may be changed to the shapes of the lower surface of the bending member 11 shown in FIGS. 6A to 6F.

Figure 9:
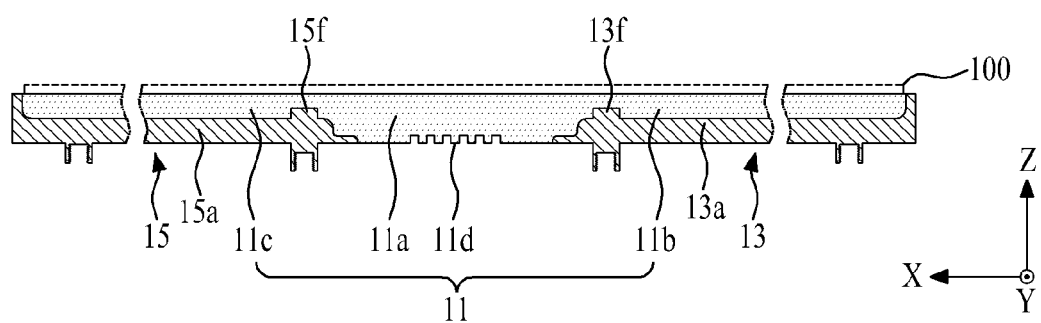
FIG. 9 is a cross sectional view illustrating a panel supporting frame according to the fourth embodiment of the present disclosure.

FIG. 9 is a cross sectional view illustrating a panel supporting member according to the fourth embodiment of the present disclosure, which is obtained by changing the first and second outer protrusions of the bending member in the panel supporting frame according to the third embodiment of the present disclosure. Accordingly, only the first and second outer protrusions of the bending member will be described in detail as follows.

Referring to FIG. 9, a first outer protrusion 11b according to the modified example additionally protrudes from an upper portion of a first long side of a body 11a toward an outer edge of a first supporting member 13. That is, an outer lateral side of the first outer protrusion 11b extends to the outer edge of the first supporting member 13, to thereby support a first panel rear portion of a flexible display panel 100. In this case, the first outer protrusion 11b overlapped with a first base plate 13a of the first supporting member 13 is physically connected with the first panel rear portion of the flexible display panel 100 by the use of adhesive member (not shown).

A second outer protrusion 11c according to the modified example additionally protrudes from an upper portion of a second long side of the body 11a toward an outer edge of a second supporting member 15. That is, an outer lateral side of the second outer protrusion 11c extends to the outer edge of the second supporting member 15, to thereby support a second panel rear portion of the flexible display panel 100. In this case, the second outer protrusion 11c overlapped with a second base plate 15a of the second supporting member 15 is physically connected with the second panel rear portion of the flexible display panel 100 by the use of adhesive member (not shown).

Accordingly, in case of the panel supporting frame 10 according to the fourth embodiment of the present disclosure, the rear surface of the flexible display panel 100 is substantially supported by the bending member 11 so that it is possible to reduce differences between touch sensations on the bendable display area and touch sensations on the first and second display areas DA1 and DA2. The configuration shown in FIG. 9 also enhances manufacturability and adhesiveness between the different materials by increasing the attachment area between the bending member 11 and each of the first and second supporting members 13 and 15.

Additionally, the panel supporting frame 10 according to the fourth embodiment of the present disclosure may further include roughness patterns 13e and 15e shown in FIG. 8 so as to increase a contact area between the bending member 11 of the flexible material and the first and second supporting members 13 and 15 of the rigid material.

Also, the lower surface of the bending member 11 in the panel supporting frame 10 according to the fourth embodiment of the present disclosure may be changed to the shapes of the lower surface of the bending member 11 shown in FIGS. 6A to 6F.

Figure 10:
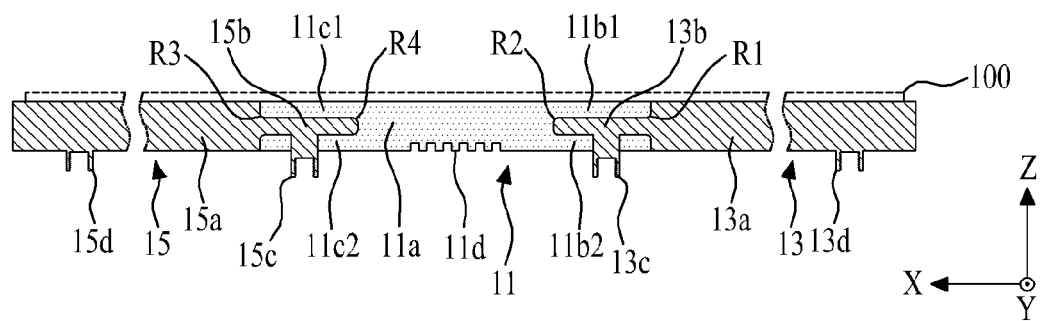
FIG. 10 is a cross sectional view illustrating a panel supporting frame according to the fifth embodiment of the present disclosure.

FIG. 10 is a cross sectional view illustrating a panel supporting frame according to the fifth embodiment of the present disclosure.

Referring to FIG. 10, the panel supporting frame 10 according to the fifth embodiment of the present disclosure may include a bending member 11, and first and second supporting members 13 and 15, which is obtained by changing a connection structure between the bending member and each of the first and second supporting members in the panel supporting frame according to the first embodiment of the present disclosure shown in FIG. 5. Accordingly, only the connection structure between the bending member 11 and each of the first and second supporting members 13 and 15 will be described in detail as follows.

The bending member 11 may include a body 11a, a pair of first outer protrusions 11b1 and 112, a pair of second outer protrusions 11c1 and 11c2, and a length compensation pattern 11d.

The body 11a and the length compensation pattern 11d shown in FIG. 10 are similar to those shown in FIGS. 1 to 5, whereby the same reference numbers will be used throughout the drawings to refer to the same or like parts, and a detailed description for the same parts will be omitted.

The first outer protrusions 11b1 and 11b2 of one pair are provided at one lateral side of the body 11a, are disposed in parallel to each other with a first gap space in-between, and are overlapped with the first supporting member 13. The first outer protrusions 11b1 and 11b2 of one pair according to one example respectively protrude from one lateral surface of the body 11a, and more particularly, upper and lower portions of a first long side of the body 11a toward the first supporting member 13 while being in parallel to each other with the first gap space in-between, and the protruding first outer protrusions 11b1 and 11b2 are overlapped with the inner side of the first supporting member 13.

The second outer protrusions 11c1 and 11c2 of one pair are provided at the other lateral side of the body 11a, are disposed in parallel to each other with a second gap space in-between, and are overlapped with the second supporting member 15. The second outer protrusions 11c1 and 11c2 of one pair according to one example respectively protrude from the other lateral side of the body 11a, and more particularly, upper and lower portions of a second long side of the body 11a toward the second supporting member 15 while being in parallel to each other with the second gap space in-between, and the protruding second outer protrusions 11c1 and 11c2 are overlapped with the inner side of the second supporting member 15.

The first supporting member 13 may include a first base plate 13a and a first inner protrusion 13b.

The first base plate 13a of FIG. 10 is similar to that of FIGS. 1 to 5, whereby the same reference numbers will be used throughout the drawings to refer to the same or like parts, and a detailed description for the same parts will be omitted.

The first inner protrusion 13b is prepared in an inner side of the first base plate 13a, and the first inner protrusion 13b is physically connected with the first outer protrusions 11b1 and 11b2 of one pair prepared in the bending member 11, to thereby provide a sandwich structure. That is, the first inner protrusion 13b, which protrudes from a central portion of an inner lateral side of the first base plate 13a toward the bending member 11, is inserted into the first gap space between the first outer protrusions 11b1 and 11b2 of one pair, and is physically connected with the first outer protrusions 11b1 and 11b2 and the body 11a.

Additionally, the first supporting member 13 may further include a first rounding portion R1 prepared at a corner between the first base plate 13a and the first inner protrusion 13b, a second rounding portion R2 prepared at each corner of the first inner protrusion 13b, a plurality of first bosses 13c vertically protruding from the first inner protrusion 13b so as to pass through any one of the first outer protrusions 11b1 and 11b2 of one pair, and a plurality of third bosses 13d vertically protruding from the lower surface of the outer side of the first base plate 13a. Herein, functions of the first and second rounding portions R1 and R2 and the plurality of first and second bosses 13c and 13d are similar to those of FIGS. 1 to 5, whereby the same reference numbers will be used throughout the drawings to refer to the same or like parts, and a detailed description for the same parts will be omitted.

The second supporting member 15 may include a second base plate 15a and a second inner protrusion 15b.

The second base plate 15a is similar to that of FIGS. 1 to 5, whereby the same reference numbers will be used throughout the drawings to refer to the same or like parts, and a detailed description for the same parts will be omitted.

The second inner protrusion 15b is prepared in an inner side of the second base plate 13a, and the second inner protrusion 15b is physically connected with the second outer protrusions 11c1 and 11c2 of one pair prepared in the bending member 11, to thereby provide a sandwich structure. That is, the second inner protrusion 15b, which protrudes from a central portion of an inner lateral side of the second base plate 15a toward the bending member 11, is inserted into the second gap space between the second outer protrusions 11c1 and 11c2 of one pair, and is physically connected with the second outer protrusions 11c1 and 11c2 and the body 11a.

Additionally, the second supporting member 15 may further include a third rounding portion R3 prepared at a corner between the second base plate 15a and the second inner protrusion 15b, a fourth rounding portion R4 prepared at each corner of the second inner protrusion 15b, a plurality of second bosses 15c vertically protruding from the second inner protrusion 13b so as to pass through any one of the second outer protrusions 11c1 and 11c2 of one pair, and a plurality of fourth bosses 15d vertically protruding from the lower surface of the outer side of the second base plate 15a. Herein, functions of the third and fourth rounding portions R3 and R4 and the plurality of second and fourth bosses 15c and 15d are similar to those of FIGS. 1 to 5, whereby the same reference numbers will be used throughout the drawings to refer to the same or like parts, and a detailed description for the same parts will be omitted.

Accordingly, in case of the panel supporting frame 10 according to the fifth embodiment of the present disclosure, the bending member 11 and each of the first and second supporting members 13 and 15 are overlapped and connected with each other in the sandwich structure so that it is possible to provide the same effect as that of the panel supporting member 10 according to the first embodiment of the present disclosure, while enhancing formability and adhesiveness between the different materials by increasing the attachment area between the bending member 11 and each of the first and second supporting members 13 and 15.

Additionally, the panel supporting frame 10 according to the fifth embodiment of the present disclosure may further include roughness patterns 13e and 15e shown in FIG. 8 so as to increase an attachment area between the bending member 11 of the flexible material and the first and second supporting members 13 and 15 of the rigid material.

Also, the lower surface of the bending member 11 in the panel supporting frame 10 according to the fifth embodiment of the present disclosure may be changed to the shapes of the lower surface of the bending member 11 shown in FIGS. 6A to 6F.

Figure 11:
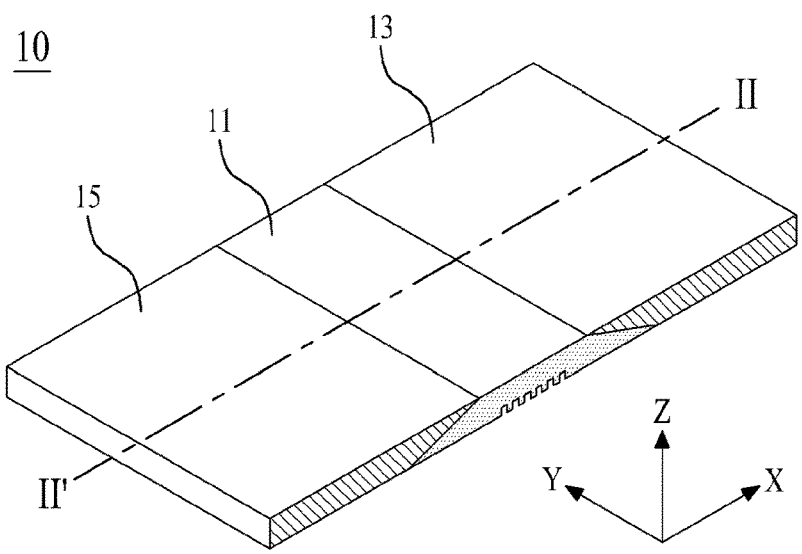
FIG. 11 is a cross sectional view illustrating a panel supporting frame according to the sixth embodiment of the present disclosure.
Figure 12:
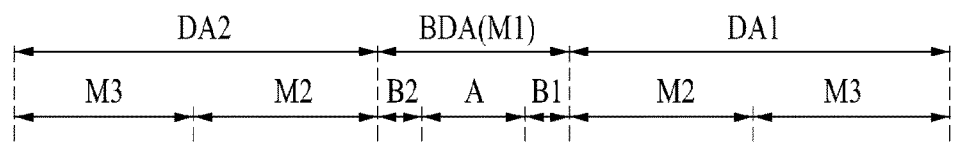
FIG. 12 is a cross sectional view along II-II' of FIG. 11.
Figure 12:
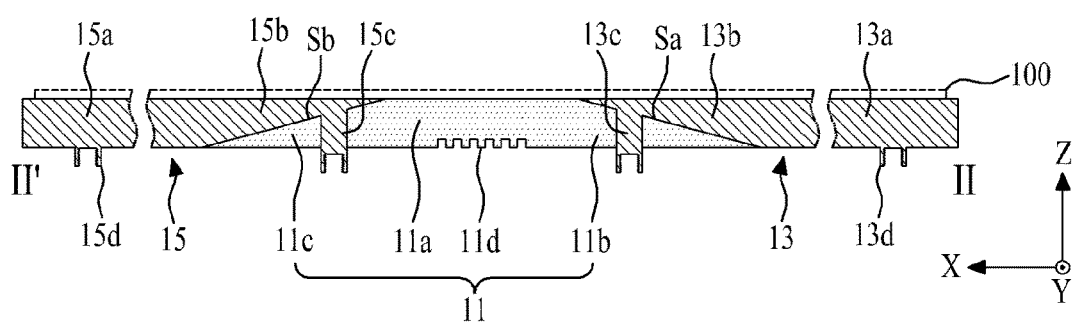

FIG. 11 is a front perspective view illustrating a panel supporting frame according to a sixth embodiment of the present disclosure, and FIG. 12 is a cross sectional view along II-II' of FIG. 11.

Referring to FIGS. 11 and 12, the panel supporting frame 10 according to the sixth embodiment of the present disclosure may include a bending member 11 and first and second supporting members 13 and 15, which is obtained by changing a connection structure between the bending member 11 and each of the first and second supporting members 13 and 15 in the panel supporting frame according to the first embodiment of the present disclosure shown in FIGS. 1 to 5. Accordingly, only the connection structure between the bending member 11 and each of the first and second supporting members 13 and 15 will be described in detail as follows.

The bending member 11 may include a body 11a, a first outer protrusion 11b, a second outer protrusion 11c and a length compensation pattern 11d.

The body 11a and the length compensation pattern 11d shown in FIG. 11 are similar to those shown in FIGS. 1 to 5, whereby the same reference numbers will be used throughout the drawings to refer to the same or like parts, and a detailed description for the same parts will be omitted.

The first outer protrusion 11b is prepared to have a first inclined side Sa at one lateral side of the body 11a, and is overlapped with the first supporting member 13. The first outer protrusion 11b according to one example, which protrudes from one lateral side of the body 11a, and more particularly, a first long side of the body 11a toward the first supporting member 13 to have a cross section of a right-angled triangle, is overlapped with an inner edge of the first supporting member 13. In this case, the first outer protrusion 11b may have the cross section of the right-angled triangle including a bottom side positioned in the same horizontal line as the lower surface of the body 11a, a height corresponding to the first long side of the body 11a, and an oblique side (or first inclined side) directly confronting with the inner edge of the first supporting member 13.

The second outer protrusion 11c is prepared to have a second inclined side Sb at the other lateral side of the body 11a, and is overlapped with the second supporting member 15. The second outer protrusion 11c according to one example, which protrudes from the other lateral side of the body 11a, and more particularly, a second long side of the body 11a toward the second supporting member 15 to have a cross section of a right-angled triangle, is overlapped with an inner edge of the second supporting member 15. In this case, the second outer protrusion 11c may have the cross section of the right-angled triangle including a bottom side positioned in the same horizontal line as the lower surface of the body 11a, a height corresponding to the second long side of the body 11a, and an oblique side (or second inclined side) directly confronting with the inner edge of the second supporting member 15.

The first supporting member 13 may include a first base plate 13a and a first inner protrusion 13b.

The first base plate 13a of FIGS. 11 and 12 is similar to that of FIGS. 1 to 5, whereby the same reference numbers will be used throughout the drawings to refer to the same or like parts, and a detailed description for the same parts will be omitted.

The first inner protrusion 13b is prepared to have a first inclined side Sa at an inner lateral side of the first base plate 13a, and is physically connected with the first outer protrusion 11b of the bending member 11. That is, the first inner protrusion 13b, which protrudes from an inner lateral side of the first base plate 13a toward the bending member 11 to have a triangle shaped cross section, is overlapped with the first outer protrusion 11b. In this case, the first inner protrusion 13b may have a cross section of a right-angled triangle including a bottom side positioned in the same horizontal line as the upper surface of the first base plate 13a, a height corresponding to the inner lateral side of the first base plate 13a, and an oblique side (or first inclined side) directly confronting with the first inclined side of the first outer protrusion 11b.

Additionally, the first supporting member 13 may further include a plurality of first bosses 13c vertically protruding from the first inner protrusion 13b to pass through the first outer protrusion 11b, and a plurality of third bosses 13d vertically protruding from the lower surface of the outer edge of the first base plate 13a. Functions of the plurality of first and third bosses 13c and 13d shown in FIGS. 11 and 12 are similar to those shown in FIGS. 1 to 5, whereby the same reference numbers will be used throughout the drawings to refer to the same or like parts, and a detailed description for the same parts will be omitted.

The second supporting member 15 may include a second base plate 15a and a second inner protrusion 15b.

The first base plate 15a of FIGS. 11 and 12 is similar to that of FIGS. 1 to 5, whereby the same reference numbers will be used throughout the drawings to refer to the same or like parts, and a detailed description for the same parts will be omitted.

The second inner protrusion 15b is prepared to have a second inclined side Sb at an inner lateral side of the second base plate 15a, and is physically connected with the second outer protrusion 11c of the bending member 11. That is, the second inner protrusion 15b, which protrudes from an inner lateral side of the second base plate 15a toward the bending member 11 to have a triangle shaped cross section, is overlapped with the second outer protrusion 11c. In this case, the second inner protrusion 15b may have a cross section of a right-angled triangle including a bottom side positioned in the same horizontal line as the upper surface of the second base plate 15a, a height corresponding to the inner lateral side of the second base plate 15a, and an oblique side (or second inclined side) directly confronting with the second inclined side of the second outer protrusion 11c.

Additionally, the second supporting member 15 may further include a plurality of second bosses 15c vertically protruding from the second inner protrusion 15b to pass through the second outer protrusion 11c, and a plurality of fourth bosses 15d vertically protruding from the lower surface of the outer edge of the second base plate 15a. Functions of the plurality of second and fourth bosses 15c and 15d shown in FIGS. 11 and 12 are similar to those shown in FIGS. 1 to 5, whereby the same reference numbers will be used throughout the drawings to refer to the same or like parts, and a detailed description for the same parts will be omitted.

Accordingly, in case of the panel supporting frame 10 according to the sixth embodiment of the present disclosure, the bending member 11 and each of the first and second supporting members 13 and 15 are connected with each other by the overlapped inclined sides Sa and Sb so that it is possible to provide a similar effect as that of the panel supporting member 10 according to the first embodiment of the present disclosure and also to reduce differences between touch sensations on the flexible display near the boundary between the flexible material and the rigid material and touch sensations on the flexible display not near the boundary.

Additionally, the panel supporting frame 10 according to the sixth embodiment of the present disclosure may further include roughness patterns 13e and 15e shown in FIG. 8 so as to increase an attachment area between the bending member 11 of the flexible material and the first and second supporting members 13 and 15 of the rigid material.

Also, the lower surface of the bending member 11 in the panel supporting frame 10 according to the sixth embodiment of the present disclosure may be changed to the shapes of the lower surface of the bending member 11 shown in FIGS. 6A to 6F.

Figure 13:
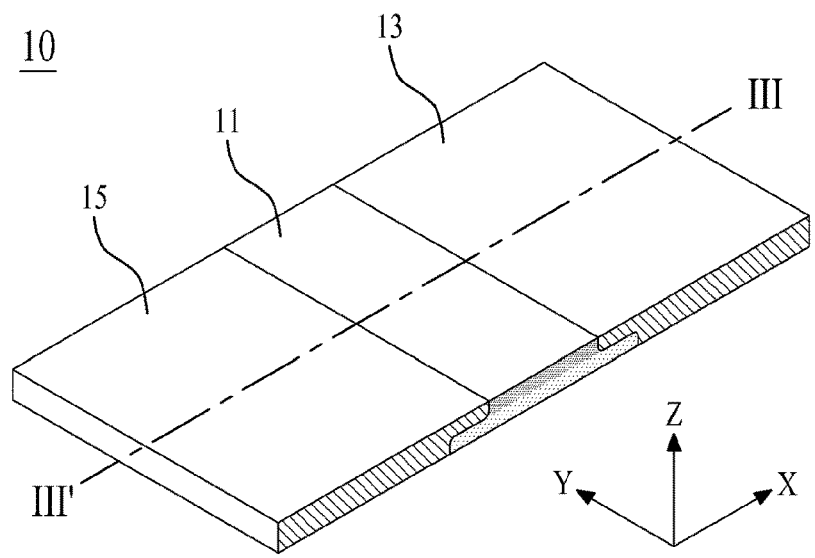
FIG. 13 is a front perspective view illustrating a panel supporting frame according to the seventh embodiment of the present disclosure.
Figure 14:
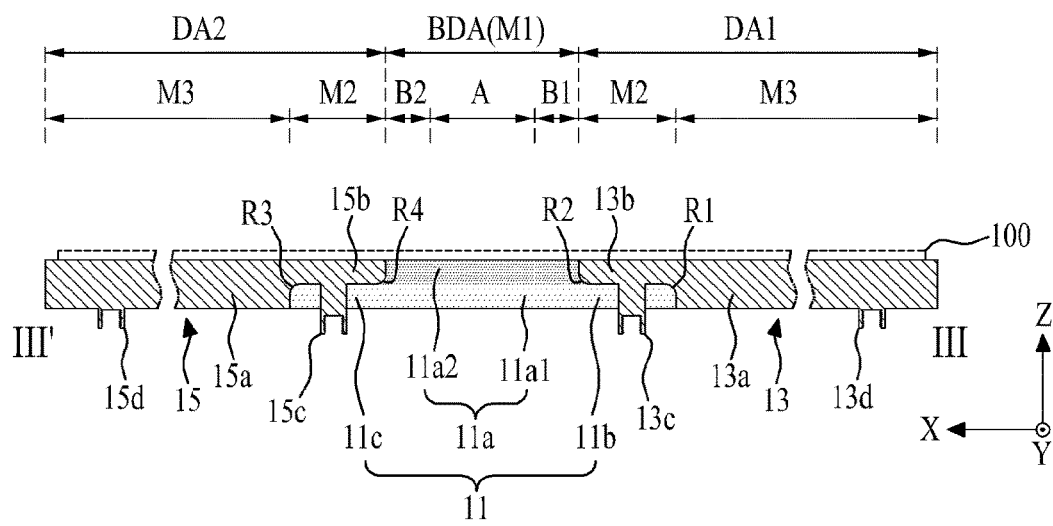
FIG. 14 is a cross sectional view along of FIG. 13.

FIG. 13 is a front perspective view illustrating a panel supporting frame according to a seventh embodiment of the present disclosure, and FIG. 14 is a cross sectional view along of FIG. 13.

Referring to FIGS. 13 and 14, the panel supporting frame 10 according to the seventh embodiment of the present disclosure may include a bending member 11 and first and second supporting members 13 and 15, which is obtained by changing a structure of the bending member in the panel supporting frame according to the first embodiment of the present disclosure shown in FIGS. 1 to 5. Accordingly, only the bending member 11 will be described in detail as follows.

The bending member 11 may include a body 11a, a first outer protrusion 11b and a second outer protrusion 11c.

The body 11a is overlapped with a bending display area (BDA) of a flexible display panel 100, wherein the body 11a supports the bending display area (BDA) of the flexible display panel 100 or guides the bending of the bending display area (BDA). The body 11a according to another example may include first and second flexible layers 11a1 and 11a2 with different stiffness levels.

The first flexible layer 11a1 may be formed of a flexible material with a first stiffness level.

The second flexible layer 11a2 may be formed of a flexible material with a second stiffness level, wherein the second stiffness level is higher than the first stiffness level. The second flexible layer 11a2 is overlapped with the first flexible layer Ital. That is, the second flexible layer 11a2 is disposed on an upper surface of the first flexible layer 11a1.

The body 11a has a deposition structure of the first and second flexible layers 11a1 and 11a2 with the different stiffness levels. Thus, when the bending member 11 is folded, a length change of the first flexible layer 11a1 is different from a length change of the second flexible layer 11a2. Especially, when the bending member 11 is folded, the length change in the first flexible layer 11a1 with the relatively-lower first stiffness level is larger than the length change in the second flexible layer 11a2 with the relatively-higher second stiffness level. Accordingly, when the bending member 11 is folded, a length change of the bending member 11 may be compensated without the aforementioned length compensation pattern. As a result, in case of the panel supporting frame 10 according to the seventh embodiment of the present disclosure, the length change of the bending member 11 is compensated by the deposition structure of the flexible materials when the bending member 11 is folded, whereby there is no need to provide the length compensation pattern for the bending member 11.

Except that the first outer protrusion 11b protrudes from one lateral side of the first flexible layer 11a1 of the body 11a, the first outer protrusion 11b shown in FIGS. 13 and 14 is similar to that shown in FIGS. 1 to 5, whereby the same reference numbers will be used throughout the drawings to refer to the same or like parts, and a detailed description for the same parts will be omitted.

Except that the second outer protrusion 11c protrudes from the other lateral side of the first flexible layer 11a1 of the body 11a, the second outer protrusion 11c shown in FIGS. 13 and 14 is similar to that shown in FIGS. 1 to 5, whereby the same reference numbers will be used throughout the drawings to refer to the same or like parts, and a detailed description for the same parts will be omitted.

In the panel supporting frame 10 according to the seventh embodiment of the present disclosure, the structure of each of the bending member 11 and the first and second supporting members 13 and 15 may be changed to the structure shown in any one of the panel supporting frames 10 according to the second to sixth embodiments of the present disclosure.

Figure 15:
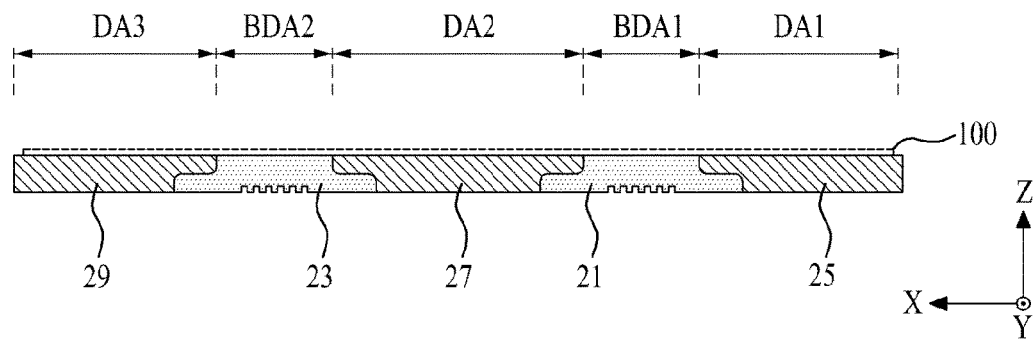
FIG. 15 is a cross sectional view illustrating a panel supporting frame according to the eighth embodiment of the present disclosure.
Figure 16:
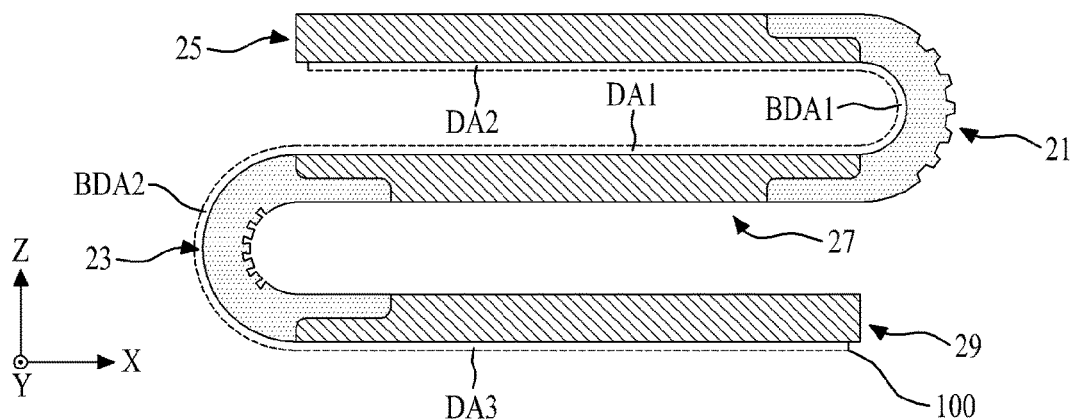
FIG. 16 is a cross sectional view illustrating a double folding state of the panel supporting frame according to the eighth embodiment of the present disclosure.

FIG. 15 is a cross sectional view illustrating a panel supporting frame according to an eighth embodiment of the present disclosure, and FIG. 16 is a cross sectional view illustrating a double folding state of the panel supporting frame according to the eighth embodiment of the present disclosure.

Referring to FIGS. 15 and 16, the panel supporting frame 10 according to the eighth embodiment of the present disclosure may include first and second bending members 21 and 23 and first to third supporting members 25, 27 and 29.

The first bending member 21, which is formed of a flexible material, supports a first bending display area (BDA1) of a flexible display panel 100.

The second bending member 23 is formed of the same flexible material as that of the first bending member 21. The second bending member 23 supports a second bending display area (BDA2) of the flexible display panel 100.

A structure in each of the first and second bending members 21 and 23 may be similar to that in any one of the bending members shown in FIGS. 1 to 14.

The first supporting member 25 is physically connected with one lateral side of the first bending member 21. In this case, the first supporting member 25 and the first bending member 21 may be overlapped and physically connected with each other. In this case, the second supporting member 27 is overlapped and physically connected with the first bending member 21, and is also overlapped and physically connected with the second bending member 23. To this end, a predetermined portion of one lateral side of the second supporting member 27 protrudes toward the first bending member 21, and a predetermined portion of the other lateral side of the second supporting member 27 protrudes toward the second bending member 23. The second supporting member 27 is connected with a second panel rear portion overlapped with a second display area DA2 of the flexible display panel 100 by the use of adhesive member. In this case, the second display area DA2 of the flexible display panel 100 may be defined with an area between the first and second bending members 21 and 23.

The third supporting member 29 is physically connected with the other lateral side of the second bending member 23. In this case, the third supporting member 29 is overlapped and physically connected with the second bending member 23. The third supporting member 29 is connected with a third panel rear portion overlapped with a third display area DA3 of the flexible display panel 100 by the use of adhesive member. A structure of the third supporting member 29 may be similar to that in any one of the second supporting members 16 shown in FIGS. 1 to 14.

Accordingly, the panel supporting frame 10 according to the eighth embodiment of the present disclosure provides the same effect as that of the panel supporting frame according to the first embodiment of the present disclosure, and enables the double folding of the flexible display panel 100 by the bending of each of the first and second bending members 21 and 23.

Figure 17:
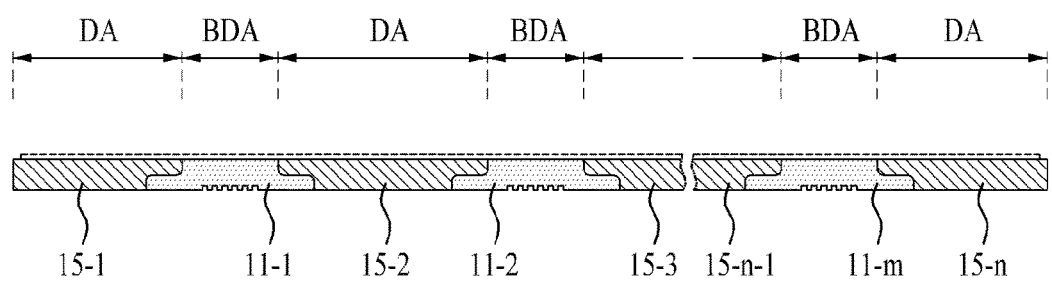
FIG. 17 is a cross sectional view illustrating a panel supporting frame according to the ninth embodiment of the present disclosure.

FIG. 17 is a cross sectional view illustrating a panel supporting frame according to a ninth embodiment of the present disclosure.

Referring to FIG. 17, the panel supporting frame 10 according to the ninth embodiment of the present disclosure may include first to n-th supporting members ('n' is an integer of 4 or more than 4) 15-1 to 15-n, and first to m-th bending members ('m' is an integer of 'n−1') 11-1 to 11-m.

The first to n-th supporting members 15-1 to 15-n are formed of a rigid material, and are physically connected with a panel rear portion of a flexible display panel 100 overlapped with a display area DA. In this case, a structure of the first supporting member 15-1 may be similar to a structure of the third supporting member 29 shown in FIG. 15. A structure of the n-th supporting member 15-n may be similar to a structure of the first supporting member 25 shown in FIG. 15. A structure of each of the second to (n−1)th supporting members 15-2 to 15-n−1 may be similar to a structure of the second supporting member 27 shown in FIG. 15.

Each of the first to m-th bending members 11-1 to 11-m is disposed between each of the first to n-th supporting members 15-1 to 15-n, and is overlapped and connected with the adjacent supporting member. Each of the first to m-th bending members 11-1 to 11-m supports a bending display area BDA of the overlapped flexible display panel 100. A structure in each of the first to m-th bending members 11-1 to 11-m may be similar to a structure in any one of the bending members shown in FIGS. 1 to 14.

The panel supporting frame 10 according to the ninth embodiment of the present disclosure provides the same effect as the panel supporting frame 10 according to the first embodiment of the present disclosure, and also allows the flexible display panel 100 to be rolled in a spiral type by the bending of each of the first to m-th bending members 11-1 to 11-m. Accordingly, the panel supporting frame 10 according to the ninth embodiment of the present disclosure may be applied for a rollable display apparatus with the flexible display panel 100 to be rolled.

Figure 18:
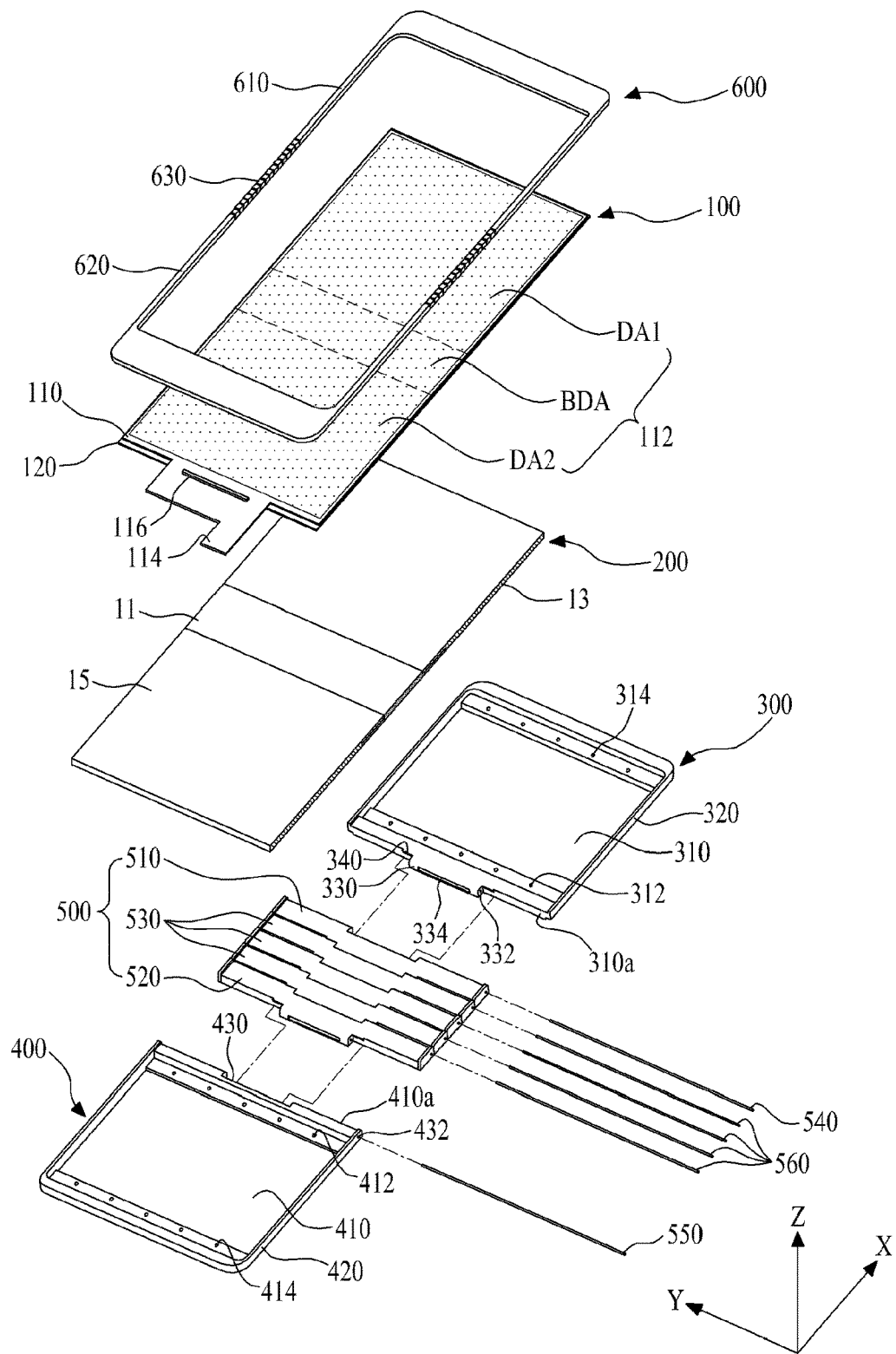
FIG. 18 illustrates a flexible display apparatus according to the first embodiment of the present disclosure.
Figure 19:
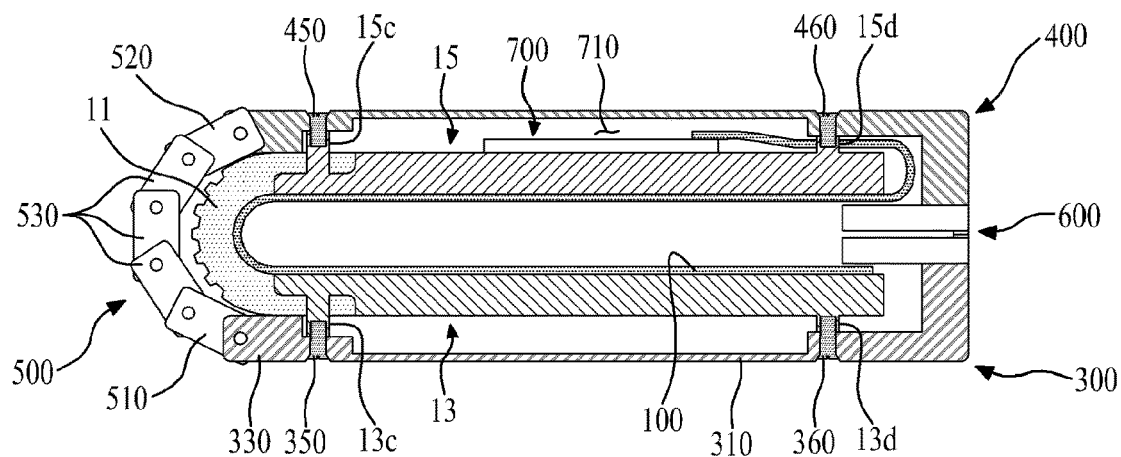
FIG. 19 illustrates an inside bending state of the flexible display apparatus according to the first embodiment of the present disclosure.

FIG. 18 illustrates a flexible display apparatus according to the first embodiment of the present disclosure, and FIG. 19 illustrates an inside bending state of the flexible display apparatus according to the first embodiment of the present disclosure.

Referring to FIGS. 18 and 19, the flexible display apparatus according to the first embodiment of the present disclosure may include a flexible display panel 100, a panel supporting frame 200, a back cover comprising a first housing 300, a second housing 400, and a hinge 500, and a front cover 600.

The flexible display panel 100 may be a flexible organic light emitting display panel, a flexible electrophoretic display panel, or a flexible electro-wetting display panel.

The flexible display panel 100 may include a display area 112 for displaying an image by a pixel array provided with a plurality of pixels. The display area 112 may include a first display area DA1, a second display area DA2 and a bending display area (BDA).

The first display area DA1 may be defined with a first area (for example, upper area) of the flexible display panel 100 positioned at one side of the bending display area (BDA) in the display area 112, and the second display area DA2 may be defined with a second area (for example, lower area) of the flexible display panel 100 positioned at the other side of the bending display area (BDA) in the display area 112.

When the flexible display panel 100 is folded in the plane state, the first display area DA1, the second display area DA2 and the bending display area (BDA) constitute one display area 112, to thereby provide a relatively large screen.

When the flexible display panel 100 is bent in accordance with a predetermined curvature with respect to the bending display area (BDA), an image is not displayed on the display area 112.

The flexible display panel 100 may further include a signal applying part 114 which has a predetermined width and length from the edge of the second area.

The signal applying part 114 may be formed of a flexible circuit film including signal transmission lines connected with a signal line of the pixel array. The signal applying part 114 is bent toward a rear surface of the second housing 400 through the second housing 400, and is connected with a system driver 700 disposed at the rear surface of the second housing 400. The signal applying part 114 may include a driving integrated circuit 116. The driving integrated circuit 116 drives pixels of the display area 112 on the basis of data signal and pixel driving signal provided from the system driver 700, to thereby display an image on the display area 112.

The rear surface of the flexible display panel 100 may be supported by a flexible supporting plate 120.

The flexible display panel 100 is maintained in the flat state by the use of flexible supporting plate 120 which is attached to the entire rear surface of the flexible display panel 100. The flexible supporting plate 120 may be formed of a plastic material, for example, any one of PI (Polyimide), PET (Polyethyleneterephthalate), PEN (Polyethylenapthanate), PC (Polycarbonate), PNB (Polynorborneen) and PES (Polyethersulfone). Herein, it is possible to omit the flexible supporting plate 120.

Additionally, the flexible display apparatus according to the first embodiment of the present disclosure may further include a touch screen (not shown) for a user interface by a user's touch. The touch screen may be attached to the flexible display panel 100, or may be provided inside the flexible display panel 100 for a process of forming the pixel array.

The panel supporting frame 200 is connected with the remaining rear surface of the flexible display panel 100 except the bending display area (BDA) of the flexible display panel 100, whereby the flexible display panel 100 is folded or unfolded in the plane state with respect to the bending display area (BDA) by the use of panel supporting frame 200. A structure of the panel supporting frame 200 is similar to that in any one of the panel supporting frames 10 according to the first to seventh embodiments of the present disclosure shown in FIGS. 1 to 14, whereby a detailed description for the same parts will be omitted.

The panel supporting frame 200 is connected with the rear surface of the flexible display panel 100. Thus, the panel supporting frame 200 together with the flexible display panel 100 is provided to form a display module so that it is possible to improve flatness of the flexible display panel 100 and also to facilitate a transfer of the flexile display panel 100 for an assembly process of the flexible display apparatus.

A first supporting member 13 of the panel supporting frame 200 is connected with the first housing 300, and a second supporting member 15 of the panel supporting frame 200 is connected with the second housing 400.

The first housing 300 is connected with one lateral side of the panel supporting frame 200, whereby an upper portion of the flexible display panel 100 is received in the first housing 300. That is, the first housing 300 is connected with the first supporting member 13 of the panel supporting frame 200, whereby the upper portion of the flexible display panel 100 corresponding to the first display area DA1 of the flexible display panel 100 is received in the first housing 300. The first housing 300 according to one example may include a first bottom surface 310, a first sidewall 320, a first hinge connection portion 330 and a rotation stopper 340.

The first bottom surface 310 supports the first supporting member 13 of the panel supporting frame 200. That is, the first bottom surface 310 is connected with the first supporting member 13 of the panel supporting frame 200 by a plurality of first and second screws 350 and 360. To this end, the first bottom surface 310 includes a plurality of first and second screw through holes 312 and 314.

The plurality of first screw through holes 312 are prepared in the inner periphery of the first bottom surface 310 adjacent to the hinge 500, and are overlapped with a plurality of first bosses 13c prepared in the first supporting member 13 of the panel supporting frame 200. The plurality of second screw through holes 314 are prepared in the outer periphery of the first bottom surface 310, and are overlapped with a plurality of third bosses 13d prepared in the first supporting member 13 of the panel supporting frame 200.

Each of the plurality of first screws 350 is coupled with each of the plurality of first bosses 13c via the first screw through hole 312, whereby the inner edge of the first supporting member 13 is fixed to the inner edge of the first bottom surface 310.

Each of the plurality of second screws 360 is coupled with each of the plurality of third bosses 13d via the second screw through hole 314, whereby the outer edge of the first supporting member 13 is fixed to the outer edge of the first bottom surface 310.

The first sidewall 320 is vertically provided in the edge of the first bottom surface 310, to thereby surround first area sides of the flexible display panel 100 supported on the first bottom surface 310. The first sidewall 320 protects each lateral side of the flexible display panel 100 and the first supporting member 13 of the panel supporting frame 200 provided on the first bottom surface 310 from an external shock.

The first hinge connection portion 330 protrudes to have a predetermined width and length from an inner sidewall 310a of the first housing 300 adjacent to a first side of the hinge 500, and the first hinge connection portion 330 is connected with the first side of the hinge 500. For example, the first hinge connection portion 330 may protrude from a central portion except both sides of the inner sidewall 310a of the first housing 300.

The first hinge connection portion 330 may include a first shaft insertion hole 332 and a first hollow 334. The first shaft insertion hole 332 penetrates through the first hinge connection portion 330 in a length direction (Y) of the first hinge connection portion 330. The first hollow 334 penetrates through the first hinge connection portion 330 in a protruding direction (X) of the first hinge connection portion 330, whereby the first hollow 334 is in communication with a circuit receiving space 710 prepared at the rear of the first housing 300.

The rotation stopper 340 protruding from an upper portion of the inner sidewall 310a of the first housing 300 adjacent to each lateral side of the first hinge connection portion 330 restrains a rotation of the hinge 500 so as to prevent the hinge 500 from being rotated above a predetermined maximum rotation angle. To this end, the rotation stopper 340 having a right-angled triangle cross section is provided in the inner sidewall 310a of the first housing 300, and is formed with an inclination surface having a predetermined curvature to restrain the rotation of the hinge 500. A protruding length of the rotation stopper 340 is set in accordance with a curvature of the bending display area (BDA) provided when the flexile display panel 100 is folded.

Additionally, the rear surface of the first housing 300 is covered by a first rear cover (not shown). The first rear cover is connected with the rear surface of the first housing 300, to thereby cover semiconductor components needed for the driving of the display panel received in the rear of the first housing 300.

The second housing 400 is connected with the other side of the panel supporting frame 200, whereby the lower portion of the flexible display panel 100 is received in the second housing 400. That is, the second housing 400 is connected with the second supporting member 15 of the panel supporting frame 200, whereby the lower portion of the flexile display panel 100 corresponding to the second display area DA2 of the flexible display panel 100 is received in the second housing 400. The second housing 400 according to one example may include a second bottom surface 410, a second sidewall 420 and a second hinge connection portion 430.

The second bottom surface 410 supports the second supporting member 15 of the panel supporting frame 200. That is, the second bottom surface 410 is connected with the second supporting member 15 of the panel supporting frame 200 by a plurality of third and fourth screws 450 and 460. To this end, the second bottom surface 410 includes a plurality of third and fourth screw through holes 412 and 414.

The plurality of third screw through holes 412 are prepared in the inner periphery of the second bottom surface 410 adjacent to the hinge 500, and are overlapped with a plurality of second bosses 15c prepared in the second supporting member 15 of the panel supporting frame 200. The plurality of fourth screw through holes 414 are prepared in the outer periphery of the second bottom surface 410, and are overlapped with a plurality of fourth bosses 15d prepared in the second supporting member 15 of the panel supporting frame 200.

Each of the plurality of third screws 450 is coupled with each of the plurality of second bosses 15c via the third screw through hole 412, whereby the inner edge of the second supporting member 15 is fixed to the inner edge of the second bottom surface 410.

Each of the plurality of fourth screws 460 is coupled with each of the plurality of fourth bosses 15d via the second screw through hole 414, whereby the outer edge of the second supporting member 15 is fixed to the outer edge of the second bottom surface 410.

The second sidewall 420 is vertically provided in the edge of the second bottom surface 410, to thereby surround second area sides of the flexible display panel 100 supported on the second bottom surface 410. The second sidewall 420 protects each lateral side of the flexible display panel 100 and the second supporting member 15 of the panel supporting frame 200 provided on the second bottom surface 410 from an external shock.

The second hinge connection portion 430 is formed to have a predetermined width and length from an inner sidewall 410a of the second housing 400 adjacent to a second side of the hinge 500, and the second hinge connection portion 430 is connected with the second side of the hinge 500. For example, the second hinge connection portion 430 is formed with the predetermined depth from a central portion except both sides of the inner sidewall 410a of the second housing 400.

An upper corner of the inner sidewall 410a of the second housing 400 confronting the hinge 500, which is not provided with the second hinge connection portion 430, may be rounded with a predetermined curvature.

The second hinge connection portion 430 may include a second shaft insertion hole 432 and a second hollow (not shown). The second shaft insertion hole 432 penetrates through the second hinge connection portion 430 in a length direction (Y) of the second hinge connection portion 430. The second hollow penetrates through the second hinge connection portion 430 in a length direction (X) of the second housing 400. The second hollow is in communication with a circuit receiving space 710 prepared at the rear of the second housing 400. The second hollow functions as a passage for cable or signal transmission film between each system driver 70 provided at the rear of each of the first and second housings 300 and 400.

Additionally, the rear of the second housing 400 is covered by a second rear cover (not shown). The second rear cover is connected with the rear surface of the second housing 400, to thereby cover a battery (not shown) and the system driver 700 received in the rear of the second housing 400.

The hinge 500 is connected between the first and second housings 300 and 400, wherein the hinge 500 guides the folding and unfolding of the flexile display panel 100, and supports the bending member 11 of the panel supporting frame 200 which is folded with the predetermined curvature or unfolded in the plane state. To this end, the hinge 500 according to one example may include a first hinge bar 510, a second hinge bar 520 and a plurality of central hinge bars 530.

Figure 20:
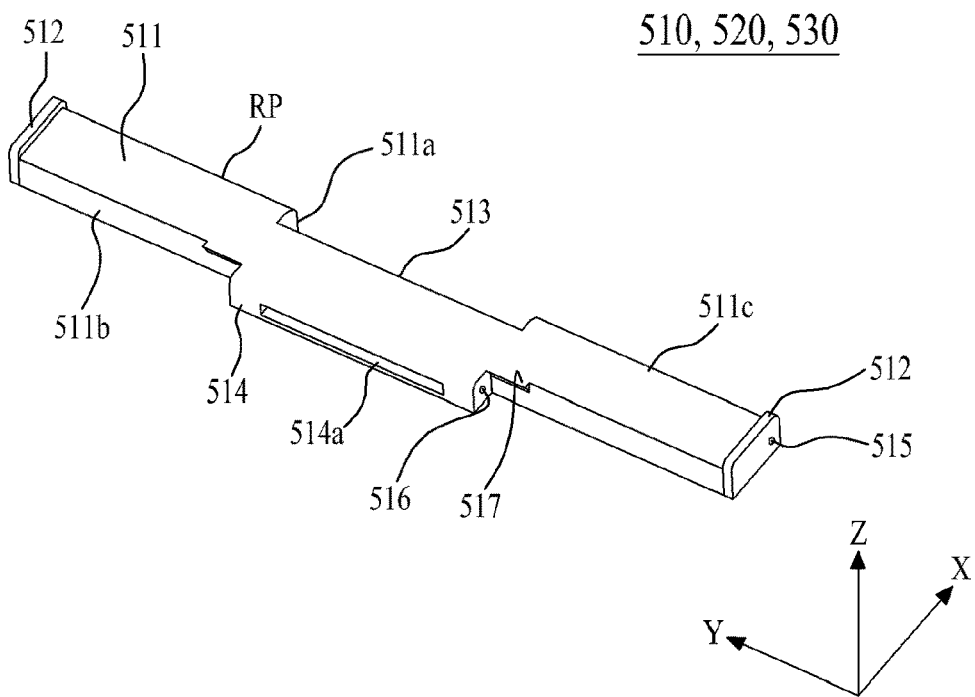
FIG. 20 illustrates a hinge bar shown in FIG. 18.

The first hinge bar 510 is rotatably connected with the first housing 300. To this end, as shown in FIGS. 18 to 20, the first hinge bar 141 according to one example may include a hinge body 511, a pair of hinge sidewalls 512, a front connection portion 513, a rear connection portion 514, a front shaft hole 515, a rear shaft hole 516 and a hinge stopper 517.

The hinge body 511 is formed in a bar shape with a rectangular cross section while being in parallel to the inner sidewall 310a of the first housing 300, wherein the hinge body 511 supports the bending member 11 of the panel supporting frame 200. In this case, a front lateral side 511a of the hinge body 511 is a vertical side which directly confronts the inner sidewall 310a of the first housing 300. An upper corner between an upper portion and the front lateral side 511a of the hinge body 511 is formed with a rounding portion RP having a predetermined curvature for a first direction rotation of the first hinge bar 510.

The pair of hinge sidewalls 512 are vertically provided at both sides of the hinge body 511 with respect to a length direction (Y) of the hinge body 511. The pair of hinge sidewalls 512 cover both lateral sides of the flexible display panel 100 disposed on an upper surface of the hinge body 511 with respect to the length direction (X) of the flexible display panel 100 so that it is possible to prevent the lateral sides of the flexible display panel 100 from being exposed to the outside.

The front connection portion 513 is provided with a hollow having a predetermined depth, wherein the first hinge connection portion 330 of the first housing 300 is inserted into the hollow of the front connection portion 513. In this case, a shape of the front connection portion 513 is similar to a shape of the first hinge connection portion 330, and the front connection portion 513 is rotatably connected with the first hinge connection portion 330.

The rear connection portion 514 protruding from a rear lateral side 511b of the hinge body 511 is capable of being inserted into the second hinge connection portion 430 of the second housing 400. In this case, a shape of the rear connection portion 514 is similar to a shape of the second hinge connection portion 430, and the rear connection portion 514 is rotatably connected with the second hinge connection portion 430.

The rear connection portion 514 may include a third hollow 514a being in communication with the first hollow 334 of the first housing 300.

The front shaft holes 515 are provided in both front edges of the hinge body 511 with the front connection portion 513 provided in-between while being in parallel. The front shaft hole 515 penetrates through the front edge of the hinge body 511 along a length direction (Y) of the hinge body 511.

The rear shaft hole 516 penetrates through the rear connection portion 514 along the length direction (Y) of the hinge body 511.

The hinge stopper 517 protrudes from an upper portion of the rear lateral side 511b of the hinge body 511 adjacent to each lateral side of the rear connection portion 514 restrains a rotation of the adjacent central hinge bar 530 so that it is possible to prevent the adjacent central hinge bar 530 from being rotated above a predetermined maximum rotation angle. To this end, the hinge stopper 517 having a right-angled triangle cross section is provided in the rear lateral side 511b of the hinge body 511, and is formed with an inclination surface having a predetermined curvature to restrain the rotation of the central hinge bar 530.

Accordingly, the first hinge bar 510 is rotatably connected with the first hinge connection portion 330 of the first housing 300 by a first shaft 540 inserted into the first shaft insertion hole 332 of the first housing 300 and the front shaft hole 515. In this case, the first shaft 540 is disposed to be positioned over both the front shaft hole 515 and the first shaft insertion hole 332 and inserted therein, whereby so that it is possible to rotatably support the first hinge bar 510 and the first hinge connection portion 330 connected with each other, and to prevent the first hinge bar 510 and the first hinge connection portion 330 from being separated from each other and being bent by an external force.

Accordingly, the first hinge bar 510 is rotated with respect to a rotation axis of the first shaft 540, and is rotated at a predetermined angle with respect to a horizontal line. For example, when the flexible display panel 100 is folded, the first hinge bar 510 is rotated in a first direction (for example, clockwise direction) by the predetermined angle for making the rounding portion RP formed in the upper corner of the front lateral side 511a be in physical contact with the rotation stopper 340 of the first housing 300 from the plane state, whereby the folding of the flexible display panel 100 is guided by the rotation of the first hinge bar 510. Also, when the flexible display panel 100 is unfolded, the first hinge bar 510 is rotated in a second direction (for example, counterclockwise direction) from the state being rotated until the vertical surface of the front lateral side 511a is in physical contact with the inner sidewall 310a of the first housing 300, thereby guiding the unfolding of the panel supporting frame 200 and supporting the bending member 11 of the unfolded panel supporting frame 200. Especially, in case of the rotation to the plane state, the first hinge bar 510 is not rotated in the second direction by the physical contact between the vertical surface of the front lateral side 511a and the inner sidewall 310a of the first housing 300 so that it is possible to support the bending member 11 of the unfolded panel supporting frame 200 and to prevent the bending display area (BDA) from being hollow by a force.

The second hinge bar 520 is rotatably connected with the second housing 400. As shown in FIGS. 18 and 20, the second hinge bar 520 includes a hinge body 511, a pair of hinge sidewalls 512, a front connection portion 513, a rear connection portion 514, a front shaft hole 515, a rear shaft hole 516 and a hinge stopper 517. Except that the second hinge bar 520 is connected with the second housing 400, a structure of the second hinge bar 520 is similar to the structure of the aforementioned first hinge bar 510, whereby a detailed description for the same parts will be omitted. The second hinge bar 520 is connected with the second hinge connection portion 430 of the second housing 400 by the second shaft 550 inserted into the second shaft insertion hole 432 of the second housing 400 and the rear shaft hole 516. Accordingly, the second housing 400 is rotated with respect to a rotation axis of the second shaft 550, and is rotated at a predetermined angle with respect to the horizontal line.

The plurality of central hinge bars 530 are connected to be rotated at a predetermined angle with respect to the horizontal line between the first hinge bar 510 and the second hinge bar 520. Each of the plurality of central hinge bars 530, as shown in FIGS. 18 and 20, includes a hinge body 511, a pair of hinge sidewalls 512, a front connection portion 513, a rear connection portion 514, a front shaft hole 515, a rear shaft hole 516 and a hinge stopper 517. Except that the plurality of central hinge bars 530 are rotatably connected by third shafts 560 between the first hinge bar 510 and the second hinge bar 520, the central hinge bar 530 is similar in structure to the aforementioned first hinge bar 510, whereby a detailed description for the same parts will be omitted.

In case of the hinge 500, the first hinge bar 510, the second hinge bar 520 and the plurality of central hinge bars 530 are connected with one another while being rotated at the predetermined angle in the plane state by the use of rotation stopper 340 and hinge stopper 517, whereby the bending display area (BDA) is guided to be unfolded in the plane state or to be folded with the predetermined curvature in accordance with the rotation angle of each of the hinge bars 510, 520 and 530 when the flexible display panel 100 is folded. In this case, the hinge body 511 of each of the hinge bars 510, 520 and 530 supports the bending member 11 of the panel supporting member 200, that is, the bending display area (BDA) which is unfolded in the plane state or folded with the predetermined curvature so that it is possible to stably maintain the curvature of the folded bending display area (BDA), and to maintain the plane state of the unfolded bending display area (BDA).

Referring once again to FIGS. 18 and 19, the front cover 600 is connected with the first and second housings 300 and 400, to thereby cover the front side of the flexible display panel 100. The front cover 600 according to one example may include a front upper cover 610, a front lower cover 620 and a pair of front central covers 630.

The front upper cover 610 may be connected with the first sidewall 320 of the first housing 300, to thereby cover the front side adjacent to the first display area DA1 of the flexible display panel 100. That is, the front upper cover 610 covers only upper side and left and right sides of the first display area DA1 except the first display area DA1 and the bending display area (BDA) adjacent to the first display area DA1. The front upper cover 610 may be formed of a rigid material.

The front lower cover 620 may be connected with the second sidewall 420 of the second housing 400, to thereby cover the front side adjacent to the second display area DA2 of the flexible display panel 100. That is, the front lower cover 620 covers only lower side and left and right sides of the second display area DA2 except the second display area DA2 and the bending display area (BDA) adjacent to the second display area DA2. The front lower cover 620 may be formed of a rigid material.

The pair of front central covers 630 may be connected between the front upper cover 610 and the front lower cover 620, to thereby cover the front side adjacent to the bending display area DA of the flexible display panel 100. That is, the pair of front central covers 630 cover only the left and right sides of the bending display area (BDA). The pair of front central covers 630 may be formed of a flexible material or a flexible material with wrinkles. In this case, each of the front upper cover 610 and the front lower cover 620 and the connection portion between the front central covers 630 of one pair may be overlapped with each other so as to improve formability and adhesiveness.

Figure 21:
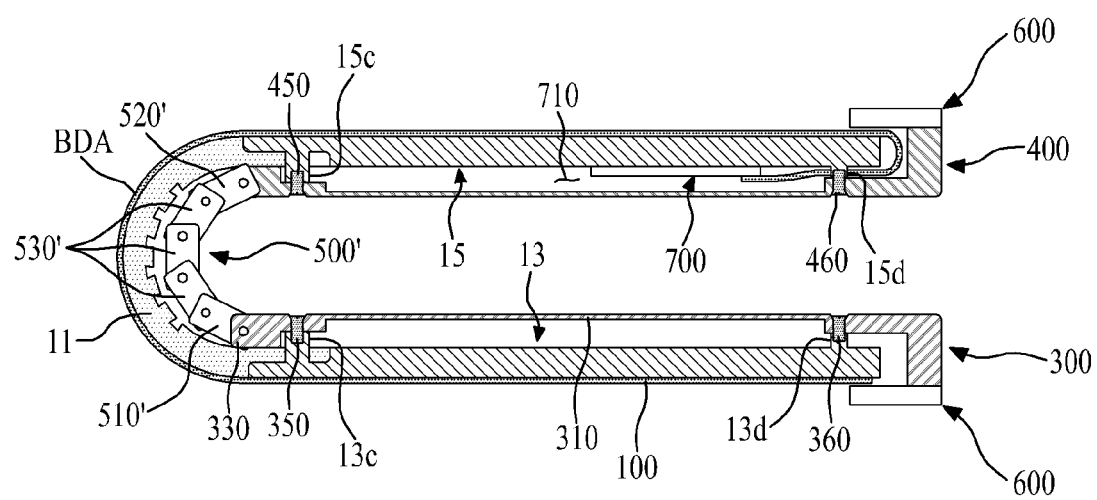
FIG. 21 illustrates an outside bending state of a flexible display apparatus according to the second embodiment of the present disclosure.

FIG. 21 illustrates an outside bending state of a flexible display apparatus according to the second embodiment of the present disclosure, which is obtained by changing a bending direction of the flexible display panel. That is, the flexible display apparatus according to the first embodiment of the present disclosure shown in FIG. 19 is bent in the inside bending method where the first and second display areas DA1 and DA2 directly confront each other with respect to the bending display area (BDA) of the flexible display panel 100 in accordance with the rotation direction of each of the hinge bars 510, 520 and 530 constituting the hinge 500.

Meanwhile, in case of the flexible display apparatus according to the second embodiment of the present disclosure shown in FIG. 21, the rotation direction of each of the hinge bars 510, 520 and 530 constituting the hinge 500 is changed so that the first and second display areas DA1 and DA2 are bent in the outside bending method, wherein the first and second display areas DA1 and DA2 face toward the outside with respect to the bending display area (BDA) of the flexible display panel 100 without directly confronting each other. Except that the hinge 500' is reversed in an up-and-down direction, the flexible display apparatus according to the second embodiment of the present disclosure is similar in structure to the flexible display apparatus according to the first embodiment of the present disclosure. The hinge 500' shown in FIG. 21 is similar to the hinge 500 shown in FIGS. 18 and 20, however, each of hinge bars 510', 520' and 530' of the hinge 500 shown in FIG. 21 is reversed in an up-and-down direction, and is connected between first and second housings 300 and 400.

Additionally, the first and second display area DA1 and DA2 of the flexible display panel 100 which is bent in the outside bending method are exposed to the outside. Thus, the first display area DA1, the second display area DA2 and the bending display area (BDA) of the folded flexible display panel 100 form the different display areas so that different images are displayed on the respective display areas. For example, in case of the flexible display panel 100 folded in the outside bending method, an image may be not displayed on the first and second display areas DA1 and DA2, or the same image or different images may be displayed on the first and second display areas DA1 and DA2 simultaneously or selectively. Especially, in case of the flexible display panel 100 folded in the outside bending method, an auxiliary screen may be provided in the bending display area (BDA), that is, an auxiliary screen for a user interface may be provided in the bending display area (BDA). In this case, the auxiliary screen may be system setting information, battery remains, wireless communication sensitivity, time information, message reception icon, and etc.

In the above flexible display apparatus according to the embodiments of the present disclosure, the hinge 500 for the connection of the first and second housings 300 and 400 includes the hinge bars 510, 520 and 530, but not necessarily. That is, the hinge structure of the flexible display apparatus according to the embodiments of the present disclosure may be changed to the hinge structure of the flexible display apparatus disclosed in US Patent Publication No. US2013/0010405, the hinge structure between the first and second housings 300 and 400 of the foldable display device disclosed, or the hinge structure between the first and second housings 300 and 400 so as to cover the bending member of the panel supporting frame of the foldable display device disclosed.

In the flexible display apparatus according to the embodiments of the present disclosure, the panel supporting frame 200 for supporting the flexible display panel 100 is connected with the first and second housings 300 and 400 so that it is possible to reduce differences between touch sensations on the bending display area (BDA) and touch sensations on the display areas DA1 and DA2 of the flexible display panel 100 for a user's screen touch, to enhance stiffness of the flexible display panel 100 by the use of panel supporting frame 200, and to maintain the bending display area of the unfolded flexible display panel in the plane state.

According to the present disclosure, the large attachment area between the bending member and the supporting member prevents the separation between the bending member and the supporting member even in the repetitive folding and unfolding.

Also, it is possible to maintain stiffness of the flexible display panel, and to protect the flexible display panel even when the flexible display panel is repetitively folded and unfolded.

Furthermore, the panel supporting frame is physically connected with and formed as one body with the lower surface of the flexible display panel except the bending display area so that it is possible to facilitate a transfer of the flexible display panel, and to improve an assembly between the flexible display panel and the housing.

In addition, it is possible to reduce differences between touch sensations on the bending display area and touch sensations on the display area of the flexible display panel for a user's screen touch, to enhance stiffness of the flexible display panel, and to maintain the bending display area of the unfolded flexible display panel in the plane state.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A supporting frame for a flexible display panel comprising:
   a bending member supporting a bendable area of the flexible display panel, the bending member configured to be bent; and
   a plurality of supporting members supporting non-bendable display areas of the flexible display panel, each of the plurality of supporting members connecting to a plurality of connecting surfaces of the bending member,
   wherein the bending member includes a body and a plurality of outer protrusions that each horizontally extend away from the body in opposite directions, each of the plurality of outer protrusions including a first connecting surface and a second connecting surface;
   wherein each of the plurality of supporting members includes a base plate and an inner protrusion that is in contact with a corresponding one of the plurality of outer protrusions, the inner protrusion of each of the plurality of supporting members including a first connecting surface that is in contact with a corresponding first connecting surface of the outer protrusions, and a second connecting surface that is in contact with a corresponding second connecting surface of the outer protrusions, and
   wherein the outer protrusions each include a roughness pattern that increases a surface area of the first connecting surface and the second connecting surface of the outer protrusions, and the inner protrusions each include a roughness pattern that increases a surface area of the first connecting surface and the second connecting surface of the inner protrusions.

2. The supporting frame for the flexible display panel of claim 1, wherein the plurality of outer protrusions of the bending member include:
   a first outer protrusion that horizontally extends from the body of the bending member in a first direction;
   a second outer protrusion that horizontally extends from the bending member in a second direction opposite the first direction; and
   wherein the plurality of supporting members include:
      a first supporting member supporting a first non-bendable display area of the flexible display panel, the first supporting member including an inner protrusion that horizontally extends towards the first outer protrusion of the bending member; and
      a second supporting member supporting a second non-bendable display area of the flexible display panel, the second supporting member including an inner protrusion that horizontally extends towards the second outer protrusion of the bending member.

3. The supporting frame for the flexible display panel of claim 1, wherein the first connecting surface of each of the plurality of outer protrusions and the first connecting surface of each of the plurality of inner protrusions has one or more rounded corners.

4. The supporting frame for the flexible display panel of claim 3, wherein a corner of the inner protrusion of the first supporting member that is in contact with the first outer protrusion of the bending member and a corner of the inner protrusion of the second supporting member that is in contact with the second outer protrusion of the bending member are rounded corners.

5. The supporting frame for the flexible display panel of claim 1, wherein the plurality of supporting members are more rigid than the bending member.

6. A supporting frame for a flexible display panel comprising:
   a bending member supporting a bendable area of the flexible display panel, the bending member configured to be bent;
   a plurality of supporting members supporting non-bendable display areas of the flexible display panel, each of the plurality of supporting members connecting to a plurality of connecting surfaces of the bending member; and
   a plurality of cylindrical bosses protruding from a lower surface of the supporting frame.

7. The supporting frame for the flexible display panel of claim 1, wherein a lower surface of the bending member is coplanar to a lower surface of each of the plurality of supporting members.

8. The supporting frame for the flexible display panel of claim 1, wherein a portion of a lower surface of the body of the bending member is inset from lower surfaces of the plurality of supporting members and lower surfaces of the plurality of outer protrusions of the bending member.

9. The supporting frame for the flexible display panel of claim 1, wherein a first portion of the bending member directly supporting the bendable portion of the flexible display comprises a first material, and a second portion of the bending member below the first portion comprises a second material that is less rigid than the first material.

10. The supporting frame for the flexible display panel of claim 1, wherein the bending member further includes a length compensation pattern on an opposite side of the bending member from a side that is in contact with the bendable portion of the flexible display panel.

11. The supporting frame for the flexible display panel of claim 10, wherein the length compensation pattern has a plurality of slits in the bending member that increase or decrease in width as the bending member is bent.

12. The supporting frame for the flexible display panel of claim 10, wherein the bending member has a body between the plurality of outer protrusions, and wherein a length of the length compensation pattern is at least 30% of a length of the body and less than 180% of the length of the body.

13. The supporting frame for the flexible display panel of claim 1, wherein the bending member is bent around a bending line passing through the bending member.

14. A flexible display apparatus, comprising:
   a flexible display panel comprising a non-bendable area and a bendable area;
   a supporting frame, comprising:
      a bending member supporting the bendable area of the flexible display panel, the bending member configured to be bent; and
      a plurality of supporting members supporting the non-bendable area of the flexible display panel, each of the plurality of supporting members connecting to a plurality of connecting surfaces of the bending member;

a back cover attached to a back of the supporting frame; and a front cover configured to couple to the back cover to enclose the flexible display panel and the supporting frame, wherein the bending member includes a body and a plurality of outer protrusions that each horizontally extend away from the body in opposite directions, each of the plurality of outer protrusions including a first connecting surface and a second connecting surface; and wherein each of the plurality of supporting members includes a base plate and an inner protrusion that is in contact with a corresponding one of the plurality of outer protrusions, the inner protrusion of each of the plurality of supporting members including a first connecting surface that is in contact with a corresponding first connecting surface of the outer protrusions, and a second connecting surface that is in contact with a corresponding second connecting surface of the outer protrusions, and wherein the outer protrusions each include a roughness pattern that increases a surface area of the first connecting surface and the second connecting surface of the outer protrusions, and the inner protrusions each include a roughness pattern that increases a surface area of the first connecting surface and the second connecting surface of the inner protrusions.

15. The flexible display apparatus of claim 14:

wherein the back cover comprises:
   a plurality of housings each coupled to one of the plurality of supporting members; and
   a hinge connecting together two of the plurality of housings, the hinge comprising a plurality of hinge bars; and wherein the hinge comprises:
   a first hinge bar rotatably connected to a first housing;
   a second hinge bar rotatably connected to a second housing; and
   a plurality of central hinge bars coupled between the first hinge bar and the second hinge bar.

16. The flexible display apparatus of claim 14, wherein the front cover comprises:

a plurality of front covers each configured to connect to one of the plurality of housings; and a flexible front central cover between two of the plurality of front covers;

wherein the bending member, the hinge, and the front central cover are bendable to guide bending of the flexible portion of the flexible display panel.

* * * * *